United States Patent
Liang et al.

(10) Patent No.: US 12,497,617 B2
(45) Date of Patent: Dec. 16, 2025

(54) SNRNA TARGETING USH2A PRE-MRNA AND APPLICATION THEREOF

(71) Applicant: GUANGZHOU REFORGENE MEDICINE CO., LTD., Guangdong (CN)

(72) Inventors: Junbin Liang, Guangdong (CN); Jiayu Ou, Guangdong (CN); Hui Xu, Guangdong (CN); Simiao Lin, Guangdong (CN)

(73) Assignee: GUANGZHOU REFORGENE MEDICINE CO., LTD., Guangzhou (CN)

( * ) Notice: Subject to any disclaimer, the term of this patent is extended or adjusted under 35 U.S.C. 154(b) by 0 days.

(21) Appl. No.: 18/764,207

(22) Filed: Jul. 4, 2024

(65) Prior Publication Data

US 2024/0352460 A1    Oct. 24, 2024

Related U.S. Application Data

(63) Continuation of application No. PCT/CN2022/140599, filed on Dec. 21, 2022.

(30) Foreign Application Priority Data

Jan. 4, 2022  (CN) .......................... 202210003448.3

(51) Int. Cl.
*C12N 15/113* (2010.01)

(52) U.S. Cl.
CPC ........ *C12N 15/113* (2013.01); *C12N 2310/14* (2013.01); *C12N 2310/333* (2013.01); *C12N 2310/3341* (2013.01); *C12N 2310/335* (2013.01); *C12N 2310/531* (2013.01); *C12N 2320/33* (2013.01)

(58) Field of Classification Search
CPC .............. C12N 15/113; C12N 2310/14; C12N 2320/33; C12N 2310/531; A61K 31/7088; A61P 27/02; A61P 27/16
See application file for complete search history.

(56) References Cited

U.S. PATENT DOCUMENTS

| | | | |
|---|---|---|---|
| 2017/0159052 A1* | 6/2017 | Van Wyk ............. | C12N 15/113 |
| 2017/0247704 A1* | 8/2017 | Bergsma ............ | C12N 15/1137 |
| 2019/0256847 A1* | 8/2019 | Van Diepen ......... | A61K 31/712 |
| 2022/0213485 A1* | 7/2022 | Garcia .................. | C12N 15/111 |

FOREIGN PATENT DOCUMENTS

| | | | |
|---|---|---|---|
| CN | 108368508 A | 8/2018 | |
| WO | 2017098187 A1 | 6/2017 | |
| WO | 2019183641 A1 | 9/2019 | |
| WO | WO-2020219981 A2 * | 10/2020 | ......... C12N 15/1136 |
| WO | 2021026075 A1 | 2/2021 | |

OTHER PUBLICATIONS

Lesman et al., Aug. 26, 2021, "U7 snRNA, a Small RNA with a Big Impact in Gene Therapy" Human Gene Therapy, vol. 32, Nos. 21-22, p. 1317-1329 (Year: 2021).*
Goyenvalle, 2012, Exon Skipping: Methods and Protocols, Methods in Molecular Biology, vol. 867, DOI 10.1007/978-1-61779-767-5_17, p. 259-271 (Year: 2012).*
Meyer and Schumperli, 2012, Alternative pre-mRNA Splicing: Theory and Protocols, First Edition, Part Six, Published by Wiley-VCH Verlag GmbH & Co. KGaA (Year: 2012).*
Mus musculus U7 small nuclear RNA (Rnu7), small nuclear RNA NCBI Reference Sequence: NR_024201.3 (Year: 2020).*
Xue and MacLaren, 2020, Expert Opinion on Investigational Drugs, vol. 9, No. 10, p. 1163-1170 (Year: 2020).*
Mar. 13, 2023 International Search Report issued in International Patent Application No. PCT/CN2022/140599.
Mar. 13, 2023 Written Opinion of The International Searching Authority issued in International Patent Application No. PCT/CN2022/140599.
Jun. 20, 2024 International Preliminary Report on Patentability issued in International Patent Application No. PCT/CN2022/140599.
Ling-hui Qu et al., Identification of 13 novel USH2A mutations in Chinese retinitis pigmentosa and Usher syndrome patients by targeted next-generation sequencing, Biosci Rep. 2020, 40(1): BSR20193536, doi:10.1042/BSR20193536.
K. Dulla et al., Antisense oligonucleotide-based treatment of retinitis pigmentosa caused by USH2A exon 13 mutations, Mol Ther., 2021; 29(8): 2441-2455, doi:10.1016/j.ymthe.2021.04.024.
Yang, Shuzhi et al., Clinical Features and Genetic Analysis of a Chinese Family with Usher Syndrome Type II, Chinese Journal of Otology, vol. 6, No. (3), Dec. 31, 2008 (Dec. 31, 2008), pp. 295-301.
He, Chenhao et al., Mutation Screening of the USH2A Gene Reveals Two Novel Pathogenic Variants Related to Simplex Usher Syndrome 2 in Chinese Patients, Journal of Tongji University (Medical Science), vol. 41, No. (3), Jun. 30, 2020 (Jun. 30, 2020), pp. 273-277.
Jul. 1, 2025 First Office Action issued in Japanese Patent Application No. 2024-540776.
Kanmin Xue et al., Antisense oligonucleotide therapeutics in clinical trials for the treatment of inherited retinal diseases, Expert Opinion on Investigational Drugs, 2020, vol. 29, No. 10, 1163-1170.

* cited by examiner

*Primary Examiner* — Soren Harward
*Assistant Examiner* — Jenna L Persons

(57) ABSTRACT

Provided is snRNA which targets USH2A pre-mRNA. The recognition domain of the snRNA is the reverse complement of a USH2A pre-mRNA sequence. The snRNA binds to the USH2A pre-mRNA to splice and jump exon 13. The snRNA promotes a higher exon 13 skipping efficiency than AON.

11 Claims, 9 Drawing Sheets

Specification includes a Sequence Listing.

SNRNA TARGETING USH2A PRE-MRNA AND APPLICATION THEREOF

CROSS-REFERENCE TO RELATED APPLICATIONS

The present application is a continuation application of International Application No. PCT/CN2022/140599, filed on Dec. 21, 2022, which claims priority of the Chinese Patent Application No. 202210003448.3 filed on Jan. 4, 2022, the contents of which are incorporated herein by reference in their entireties.

REFERENCE TO SEQUENCE LISTING

The instant application contains a Sequence Listing as an XML file entitled "Substitute P244115951US_ CASE-Q.xml" created on Feb. 20, 2025, with a size of 66,251 bytes.

TECHNICAL FIELD

The present invention relates to the technical field of gene engineering, and more particularly, to snRNA targeting USH2A pre-mRNA and application thereof.

BACKGROUND

Usher syndromes are a class of genetic diseases, also known as deafness-retinitis pigmentosa syndromes, which are characterized by varying degrees of congenital sensorineural hearing loss and retinitis pigmentosa (RP)-induced progressive vision loss. Clinically, the Usher syndromes can be divided into three types: 1. Type I Usher syndrome, in which a patient suffers congenital heavily-severe sensorineural hearing loss in terms of hearing, vestibular response appearance in terms of vestibular response, and retinitis pigmentosa before puberty in terms of vision, and is then gradually blind, and genes associated with this type include MYO7A, CDH23, USH1C, PCHD15, etc.; 2. Type II Usher syndrome, in which a patient suffers congenital moderately severe sensorineural hearing loss in terms of hearing, normal vestibular response, and retinitis pigmentosa during puberty in terms of vision, and is then gradually blind, and genes associated with this type include USH2A, GPR98, WHRN, etc.; and 3. Type III Usher syndrome, in which a patient suffers progressive sensorineural hearing loss in terms of hearing, normal vestibular response, and retinitis pigmentosa at the end of puberty in terms of vision, and is then gradually blind, and genes associated with this type include CLRN1, etc. Type II Usher syndrome accounts for more than 50% of Usher syndromes, while USH2A gene mutation is the most common cause of Type II Usher syndrome, covering more than 50% of patients with Usher syndromes. At the same time, mutations in a USH2A gene are also one of the important causes of nonsyndromic retinitis pigmentosa (NSRP).

USH2A, which is localized at 1q41 and has a span of more than 800 kb in a genome, encodes a large transmembrane protein Usherin, is anchored to plasma membranes of retinal photoreceptors cells and inner ear hair cells, and thus is an essential component for cilia development and maintenance. In the retina, Usherin is an important part of a USH2 complex and is regarded to play a role in stabilizing the outer segments of photoreceptors. USH2A has two subtypes, and the main subtypes in retinal cells contain seventy-two Exons each having a coding region length of about 15.6 kb. An extracellular portion of a Usherin protein contains several repeating domains, including ten Laminin EGF-like (LE) domains and thirty-five Fibronectin type 3 (FN3) domains. A human USH2A Exon 13 has a length of 642 bp and encodes amino acids 723-936, which are four of ten LE domains in the Usherin protein.

Mutations in Exon 13, Exon 50, and Intron 40 of a USH2A gene cause Usher syndromes. To date, more than 1,000 pathogenic mutations have been identified throughout the USH2A gene, and Exon 13 is the most frequently mutated one in the USH2A gene, accounting for about 35%. Mutations in Exon 13 of the USH2A gene comprise c.2802T>G (p.Cys934Trp, the most frequent mutation in Chinese patients), c.2299delG (p.Glu767Serfs*21, the most frequent mutation in European and American patients), c.2276G>T (p.cys759phe, the most common mutation site in nonsyndromic RP), c.2522C>A (p.S841Y), c.2242C>T (p.Gln748X), c.2541C>A (C847X), c.2761delC (Leu921fs), as well as c.2776C>T (p.R926C), c.2209C>T, c.2310delA, c.2391_2392delTG, c.2431A>T, c.2431_2432delAA, c.2440C>T, c.2525dup, c.2610C>A, c.2755C>T, c.2176T>C, c.2236C>G, c.2296T>C, c.2332G>T, and c.2339 G>T (PMID: 31904091).

For Exon 13 of the USH2A gene, there are generally three common methods in the prior art. In the first method, Exon 13 is deleted directly by editing genomic DNA by a CRISPR/Cas system, or a site related to RNA splicing is destroyed. In the second method, key bases of the above splicing-related site are modified by using a single-base editor, which can also promote Exon skipping. In the third method, antisense oligonucleotides (AONs) are used to perform target interference on pre-mRNA splicing, which promotes the Exon skipping efficiency.

CONTENT OF THE PRESENT INVENTION

The present invention provides snRNA which targets USH2A pre-mRNA.

The present invention provides snRNA that targets the USH2A pre-mRNA. The snRNA comprises a recognition domain that is reversely complementary to the USH2A pre-mRNA sequence. The snRNA binds to the USH2A pre-mRNA to induce splicing skipping of Exon 13.

After investigating and researching USH2A, the inventors have found that, since a coding region of USH2A has a length of about 15.6 kb, such a large coding sequence is hardly packaged by conventional gene therapy delivery methods (e.g., recombinant lentivirus and recombinant adeno-associated virus), so it is difficult to directly deliver USH2A for treatment. However, Exon 12 of mouse USH2A is homologous to Exon 13 of human USH2A, both of which have a length of 642 bp, and the deletion of this Exon may not cause subsequent frameshift mutations. At the same time, the inventors have found that after knocking out Exon 12 of mouse USH2A, Usherin is still able to correctly locate and perform normal functions. Therefore, Exon 13 of human USH2A containing pathogenic mutations can be treated with a series of means to cause skipping.

At the same time, there is a small nuclearRNA (snRNA) in a cell, which is a main component of an RNA spliceosome in the post-transcriptional processing of eukaryotes and participates in the processing of mRNA precursors by binding to an snRNP protein. snRNA has a length of about 100-215 nucleotides in mammals, which are divided into seven categories, numbered U1-U7 because of its abundance of U. However, U7-snRNP does not participate in splicing but is a key factor in the unique 3' end processing of a replication-dependent histone (RDH) pre-mRNA.

Therefore, the inventors replace a non-canonical Sm-binding site of U7-snRNA with a consensus sequence derived from major spliceosome U-snRNPs and change a histone-binding sequence of a 5' region of U7-snRNA into a complementary sequence of a gene to be modified, which can induce splicing skipping of Exons by targeting the exons.

The inventors have found seven target regions and twenty-one target sites of U7-snRNP-induced splicing skipping through target screening to induce a splicing skipping effect of Exon 13 and also designed a recognition domain of U7-smOPT-snRNA to be reversely complementary to a splicing-skipping-related site of Exon 13 of USH2A pre-mRNA, thereby inducing the binding of U7-smOPT-snRNA to the splicing-skipping-related site of Exon 13 of USH2A pre-mRNA, and further inducing splicing skipping of Exon 13 of USH2A pre-mRNA. In some examples, Exon 12 is retained, such that the probabilities of double skipping (e.g., unexpected splicing skipping) of Exon 12 and Exon 13 are significantly reduced, which ensures safety while improving efficiency significantly.

In one example, the USH2A pre-mRNA sequence is selected from the following regions: Exon 13, Intron 12, or Intron 13 of USH2A.

In one example, the USH2A pre-mRNA sequence is selected from Exon 13 of USH2A and a region extending 50 bp to both sides.

In one example, the USH2A pre-mRNA sequence is selected from Exon 13 of USH2A and a region extending 20 bp to both sides.

In one example, the Exon 13 includes wild-type Exon 13 or Exon 13 containing mutations.

In one example, the mutations comprise at least one of the following mutation sites: c.2242C>T, c.2276G>T, c.2299delG, c.2522C>A, c.2541C>A, c.2761delC, c.2776C>T, c.2802T>G, c.2209C>T, c.2310delA, c.2391_2392delTG, c.2431A>T, c.2431_2432delAA, c.2440C>T, c.2525dup, c.2610C>A, c.2755C>T, c.2176T>C, c.2236C>G, c.2296T>C, and c.2332G>T.

In one example, the genomic location (corresponding to a GRch38 version of an NCBI database) region corresponding to the USH2A pre-mRNA sequence is selected from Chr1: 216247142-216247185, Chr1: 216247130-216247161, Chr1: 216246616-216246649, Chr1: 216247213-216247246, Chr1: 216247204-216247232, Chr1: 216247187-216247220, and/or Chr1: 216247169-216247202.

In one example, the USH2A pre-mRNA sequence is selected from the following sequences: SEQ ID NOs: 1-7.

In one example, the genomic location region corresponding to the USH2A pre-mRNA sequence is selected from Chr1: 216247223-216247246, Chr1: 216247218-216247241, Chr1: 216247213-216247236, Chr1: 216247209-216247232, Chr1: 216247204-216247227, Chr1: 216247197-216247220, Chr1: 216247191-216247214, Chr1: 216247187-216247210, Chr1: 216247179-216247202, Chr1: 216247174-216247197, Chr1: 216247169-216247192, Chr1: 216247162-216247185, Chr1: 216247155-216247178, Chr1: 216247147-216247168, Chr1: 216247147-216247173, Chr1: 216247142-216247165, Chr1: 216247138-216247161, Chr1: 216247130-216247153, Chr1: 216246626-216246649, Chr1: 216246622-216246645, and/or Chr1: 216246616-216246639.

In one example, the recognition domain of the snRNA is reversely complementary to a continuous sequence of at least 16 bp in the USH2A pre-mRNA sequence.

In one example, the recognition domain of the snRNA is reversely complementary to a continuous sequence of at least 17 bp in the USH2A pre-mRNA sequence.

In one example, the recognition domain of the snRNA is reversely complementary to a continuous sequence of at least 18 bp in the USH2A pre-mRNA sequence.

In one example, the recognition domain of the snRNA is reversely complementary to a continuous sequence of at least 19 bp in the USH2A pre-mRNA sequence.

In one example, the recognition domain of the snRNA is reversely complementary to a continuous sequence of at least 20 bp in the USH2A pre-mRNA sequence.

In one example, the recognition domain of the snRNA is reversely complementary to a continuous sequence of at least 21 bp in the USH2A pre-mRNA sequence.

In one example, the recognition domain of the snRNA is reversely complementary to a continuous sequence of at least 22 bp in the USH2A pre-mRNA sequence.

In one example, the recognition domain of the snRNA is reversely complementary to a continuous sequence of at least 23 bp in the USH2A pre-mRNA sequence.

In one example, the recognition domain of the snRNA is reversely complementary to a continuous sequence of at least 24 bp in the USH2A pre-mRNA sequence.

In one example, the recognition domain of the snRNA is reversely complementary to a continuous sequence of at least 18-40 bp in the USH2A pre-mRNA sequence.

In one example, the recognition domain of the snRNA is reversely complementary to a continuous sequence of at least 20-27 bp in the USH2A pre-mRNA sequence.

In one example, the recognition domain of the snRNA is selected from the following sequences: SEQ ID NOs: 8-28.

In one example, the genomic location corresponding to the USH2A pre-mRNA sequence is selected from Chr1: 216247213-216247236, Chr1: 216247209-216247232, Chr1: 216247204-216247227, Chr1: 216247197-216247220, Chr1: 216247191-216247214, Chr1: 216247187-216247210, Chr1: 216247179-216247202, Chr1: 216247174-216247197, and/or Chr1: 216247169-216247192.

In one example, the recognition domain of the snRNA is selected from the following sequences: SEQ ID NOs: 10-18.

In one example, the genomic location corresponding to the USH2A pre-mRNA sequence is selected from Chr1: 216247162-216247185, Chr1: 216247155-216247178, Chr1: 216247147-216247168, Chr1: 216247147-216247173, Chr1: 216247142-216247165, Chr1: 216247138-216247161, Chr1: 216247130-216247153, Chr1: 216246626-216246649, Chr1: 216246622-216246645, and/or Chr1:216246616-216246639.

In one example, the recognition domain of the snRNA is selected from the following sequences: SEQ ID NOs: 19-28.

In one example, the genomic location corresponding to the USH2A pre-mRNA sequence is selected from Chr1: 216247213-216247236, Chr1: 216247209-216247232, Chr1: 216247204-216247227, Chr1: 216247197-216247220, Chr1: 216247191-216247214, Chr1: 216247187-216247210, Chr1: 216247179-216247202, Chr1: 216247174-216247197, Chr1: 216247169-216247192, Chr1: 216247162-216247185, Chr1: 216247155-216247178, Chr1: 216247147-216247168, Chr1: 216247147-216247173, Chr1: 216247142-216247165, and/or Chr1: 216247130-216247153.

In one example, the recognition domain of the snRNA is selected from the following sequences: SEQ ID NOs: 10-23, or SEQ ID NO: 25.

In one example, the genomic location corresponding to the USH2A pre-mRNA sequence is selected from Chr1: 216247213-216247236, Chr1: 216247209-216247232, Chr1: 216247204-216247227, Chr1: 216247197-216247220, Chr1: 216247191-216247214, Chr1: 216247187-216247210, Chr1: 216247179-216247202, Chr1: 216247174-216247197, Chr1: 216247169-216247192, Chr1: 216247162-216247185, Chr1: 216247147-216247168, Chr1: 216247147-216247173, Chr1: 216247142-216247165, and/or Chr1: 216247130-216247153.

In one example, the recognition domain of the snRNA is selected from the following sequences: SEQ ID Nos: 10-19, SEQ ID NOs: 21-23, or SEQ ID NO: 25.

In one example, the genomic location corresponding to the USH2A pre-mRNA sequence is selected from Chr1: 216247218-216247241, Chr1: 216247187-216247210, Chr1: 216247147-216247168, Chr1: 216247147-216247173, Chr1: 216247142-216247165, and/or Chr1: 216247130-216247153.

In one example, the recognition domain of the snRNA is selected from the following sequences: SEQ ID NO: 9, SEQ ID NO: 15, SEQ ID NO: 21, SEQ ID NO: 22, SEQ ID NO: 23, or SEQ ID NO: 25.

In one example, the recognition domain of the snRNA is selected from the following sequences: SEQ ID NO: 15, SEQ ID NO: 21, SEQ ID NO: 22, or SEQ ID NO: 23.

In one example, the snRNA is either U1-snRNA or U7-snRNA.

In one example, the U7-snRNA is chemically synthesized.

In one example, at least one nucleotide in the chemically synthesized U7-snRNA is chemically modified.

In one example, the chemical modification comprises at least one of 2'-O alkyl modification, 2'-O-methoxyl modification, or 2'-O-methoxyethyl modification.

In one example, the 2'-O alkyl modification is a 2'-O-methyl modification.

In one example, at least one nucleotide in the chemically synthesized U7-snRNA is linked by a phosphate bond, the phosphate bond comprises at least one of a phosphorothioate bond, a dithiophosphate bond, an alkyl phosphonate bond, an amide phosphate bond, a borane phosphate bond, or chirally linked phosphorus.

In one example, 6-80 nucleotides on both sides of the chemically synthesized U7-snRNA are chemically modified and linked by the phosphate bond.

In one example, 1-10 nucleotides on both sides of the chemically synthesized U7-snRNA are chemically modified and linked by the phosphate bond.

In one example, 3-40 bases on both sides of the chemically synthesized U7-snRNA are chemically modified and linked by the phosphate bond.

In one example, all nucleotides of the chemically synthesized U7-snRNA are linked by phosphorothioate bonds, and all are subjected to 2'-O-methoxyl modification.

In one example, three nucleotides on both sides of the chemically synthesized U7-snRNA are linked by phosphorothioate bonds, and subjected to 2'-O-methoxyl modification.

In one example, the first nucleotide at a 5' end of the chemically synthesized U7-snRNA is adenylic acid.

In one example, the first nucleotide at a 5' end of a recognition domain of the chemically synthesized U7-snRNA is adenylic acid.

In one example, there are 0-5 mismatched nucleotides in the reversely complementary pairing of the recognition domain of the chemically synthesized U7-snRNA and a target site.

In one example, there is 0-1 mismatched nucleotide in the reversely complementary pairing of the recognition domain of the chemically synthesized U7-snRNA and the target site.

In one example, the recognition domain of the chemically synthesized U7-snRNA has a sequence length greater than or equal to 16 bp.

In one example, the recognition domain of the chemically synthesized U7-snRNA has a sequence length of 18 bp-40 bp.

In one example, the recognition domain of the chemically synthesized U7-snRNA has a sequence length of 20 bp-27 bp.

In one example, the chemically synthesized U7-snRNA continues to extend by the sequence length of the recognition domain along a 5' end or/and a 3' end of a target sequence by reversely complementary pairing.

In one example, the extended sequence length of the recognition domain is less than or equal to 40 bp.

In one example, the snRNA comprises a sm sequence.

In one example, the sm sequence is a smOPT sequence, the smOPT sequence is shown in SEQ ID NO: 31.

In one example, the snRNA comprises a recognition domain, a smOPT sequence, and a U1-snRNA scaffold or U7-snRNA scaffold sequence; preferably, the U7-snRNA scaffold sequence is shown in SEQ ID NO: 68.

In one example, the snRNA further comprises a motif that recruits a splicing regulatory protein.

In one example, a free tail is introduced at the 5' end of the U7-snRNA, the free tail sequence comprises the motif that recruits the splicing regulatory protein.

In one example, the splicing regulatory protein comprises at least one of hnRNPA1, SRSF1, RBM4, DAZAP1, or SR.

In one example, the free tail sequence comprises at least one hnRNPA1-binding motif.

In one example, the free tail sequence comprises two hnRNPA1-binding motifs.

The present invention further provides a nucleic acid comprising a nucleotide sequence coding the snRNA.

The present invention further provides a gene expression cassette. The gene expression cassette comprises the snRNA, and/or the nucleic acid.

The present invention further provides a vector. The vector comprises the snRNA, the nucleic acid, and/or the gene expression cassette.

In one example, the vector comprises a vector backbone and the snRNA, wherein the vector backbone comprises a promoter, a smOPT sequence, and an snRNA gene-specific 3' box, the promoter is linked to the smOPT sequence through a Type IIs type restriction enzyme recognition site.

In one example, the vector is selected from pUC57, pAAV-CMV, lentivirus, or transposon.

In one example, the snRNA gene-specific 3' box is a gene fragment with 28-131 bp epitaxial at a 3' end of an snRNA gene.

In one example, the snRNA gene-specific 3' box is a gene fragment with a length of 106 bp at the 3' end of the snRNA gene.

The present invention further provides a virus particle. The virus particle comprises the snRNA, the nucleic acid, and/or the vector.

In one example, the virus particle is an AAV virus.

In one example, a capsid protein of the AAV virus is a naturally derived variant based on naturally derived capsid protein.

In one example, the capsid protein of the AAV virus is derived from animals or plants.

In one example, the capsid protein of the AAV virus is selected from AAV1, AAV2, AAV3, AAV5, AAV6, AAV7, AAV8, AAV9, AAVrh8, AAVrh10, or AAVrh43.

In one example, the variant AAV virus based on the naturally derived capsid protein is an AAV virus obtained after directed evolution based on the naturally derived capsid protein or reasonable modification of amino acids/peptide fragments.

In one example, the variant AAV virus is selected from AAV2.5, AAV2i8, AAV-TT, AAV9.HR or CAM130.

In one example, when the AAV virus is AAV ITR, a serotype is consistent with a serotype of a Rep gene.

The present invention further provides a cell. The cell comprises the snRNA, the nucleic acid, the vector, and/or the virus particle.

The present invention further provides a pharmaceutical composition. The pharmaceutical composition comprises the snRNA, the nucleic acid, the vector, and/or the virus particle.

The present invention further provides a method for obtaining a Usherin protein with the deletion of an Exon 13 expression product, the method comprises contacting the USH2A pre-mRNA with the snRNA, the nucleic acid, the vector, the gene expression cassette, the viral particle, the cell, and/or the pharmaceutical composition.

In one example, the method is used in scientific research.

The present invention further provides an application of the method in the process of performing splicing skipping of Exon 13 in USH2A pre-mRNA, preparing mature USH2A mRNA with the deletion of Exon 13, obtaining a Usherin protein with the deletion of Exon 13, and/or inhibiting the expression and function of Exon 13 in USH2A pre-mRNA.

The present invention further provides an application of the snRNA, the nucleic acid, the vector, the gene expression cassette, the virus particle, or the cell in the preparation of a drug for the prevention and/or treatment of eye diseases and/or ear diseases.

In one example, the eye diseases are deafness-retinitis pigmentosa syndromes or non-syndromic retinitis pigmentosa diseases.

Compared with the prior art, the present invention has the following technical effects:

According to the snRNA of the present invention that targets the USH2A pre-mRNA, Exon 13 in the USH2A is selected as a target region to induce splicing skipping of Exon 13, so as to treat eye diseases and ear diseases with USH2A protein dysfunctions caused by the missense, frameshift, codon termination, nonsense mutation, synonymous mutation of Exon 13 in USH2A. Meanwhile, according to the U7-snRNA that targets USH2A, U7-snRNP which does not participate in splicing, but is a key factor for processing at a unique 3' end of replication-dependent histone (RDH) pre-mRNA. In addition, the modified U7-snRNA is a unique working mechanism in which a non-canonical Sm-binding site of the U7-snRNA is replaced with a consensus sequence derived from major spliceosome U-snRNPs and a histone-binding sequence in a 5' region of the U7-snRNA is changed to a complementary sequence of a gene to be modified. The splicing skipping of Exon 13 in the USH2A pre-mRNA is induced by binding snRNA that targets USH2A pre-mRNA.

DETAILED DESCRIPTION OF THE PREFERRED EMBODIMENT

Figure 1:
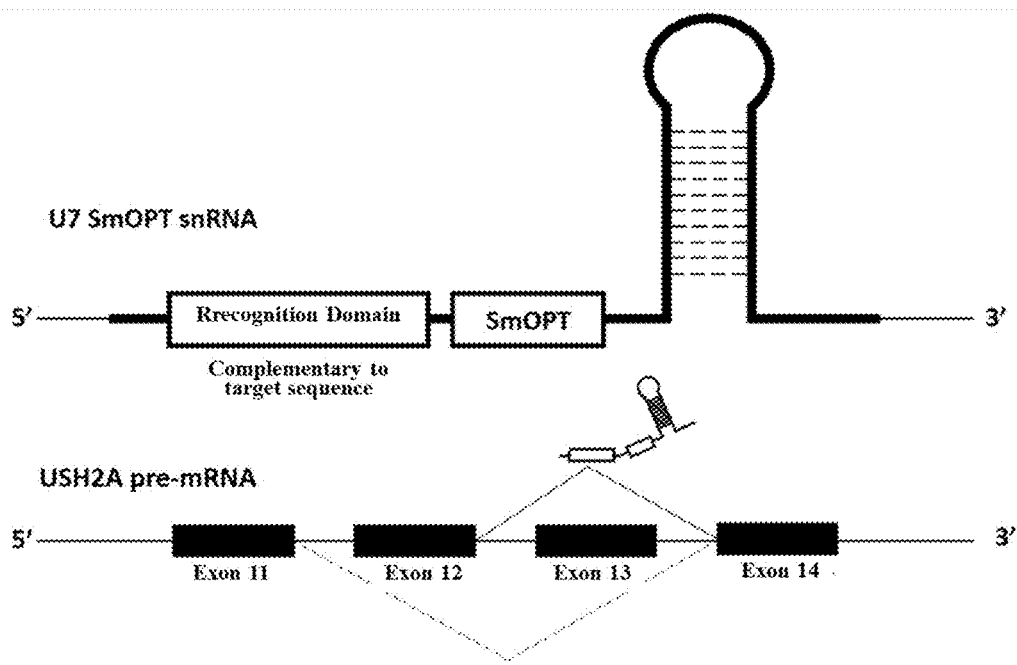
FIG. 1 is a schematic diagram of the structure and function of U7-snRNA.

To facilitate the understanding of the present invention, the present invention will be described more comprehensively with reference to the relevant drawings below. Preferred examples of the present invention are given in the drawings. However, the present invention may be implemented in many different forms and is not limited to the examples described herein. On the contrary, the purpose of providing these examples is to make the disclosure of the present invention more thorough and comprehensive.

Unless otherwise defined, all technical and scientific terms used in the present invention have the same meaning as commonly understood by a person of ordinary skill in the art. The terms used in the description of the present invention herein are only for the purpose of describing specific examples and are not intended to limit the present invention. The term "and/or" as used herein comprises any combinations of one or more related listed items. It should be noted that when a sequence is referred to as being "selected from" another sequence, it may be either another sequence or a sequence fragment within another sequence; when a genomic location region is "selected from" another genomic location region, its corresponding sequence may be directly a sequence corresponding to another gene location region or a sequence fragment corresponding to another gene location region; and the sequence comprises DNA or RNA.

Definitions the snRNA of the present invention is a main component of an RNA spliceosome in the post-transcriptional processing of eukaryotes and participates in the processing of mRNA precursors by binding to an snRNP protein.

Material Sources:
AAVpro® Helper Free System (AAV5) kit (TAKARA, Code No. 6650)

The reagents, materials, and equipment used in this embodiment, unless otherwise specified, are commercially available sources; and unless otherwise specified, the experimental methods are all conventional experimental methods in the field.

Example 1

Design and vector construction of U7-snRNA system.
1. Synthesis of U7-snRNA expression vector backbone.

Wild-type U7-snRNA comprises a stem-loop structure (scaffold), a U7-specific Sm sequence (AAUUUGUCUAG, SEQ ID NO: 61), and a recognition domain (complementary to histone pre-mRNA).

According to U7-snRNA in this example, based on a gene sequence (NCBI Reference Sequence: NR_024201.3) of mouse wild-type U7-snRNA on NCBI, a U7-specific sm sequence AATTTGTCTAG (SEQ ID NO: 30) was replaced with an optimized consensus sm sequence, i.e., smOPT: AATTTTTGGAG (SEQ ID NO: 31), an original recognition domain at a 5' end of a smOPT sequence was replaced with a recognition domain that was reversely complementary to a specific target site of the USH2A pre-mRNA, and a U7 original stem-loop structure sequence is retained at a 3' end of the smOPT sequence, as shown in FIG. 1. A sequence of the recognition domain of U7-snRNA that target-induced Exon 13 in USH2A pre-mRNA was reversely complementary pairing with a target sequence selected from Intron 12-Exon 13-Intron 13 in USH2A pre-mRNA.

Figure 2:
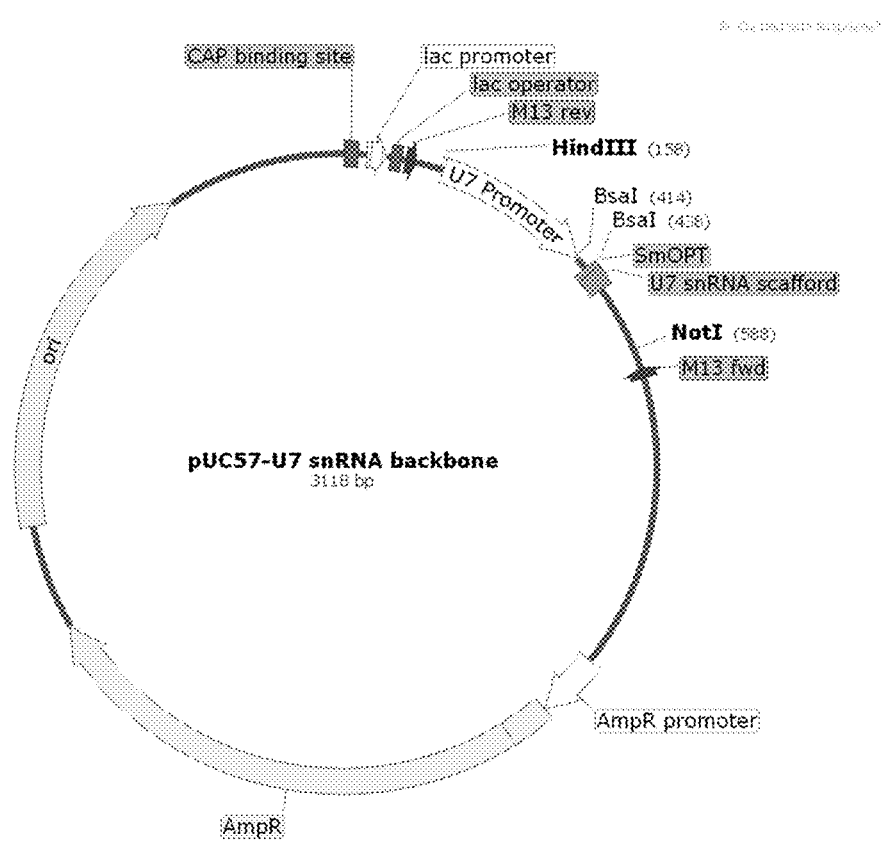
FIG. 2 is a map of a backbone vector of pUC57-U7 snRNA.

The specific operation process was as follows: firstly, a pUC57 vector (as shown in FIG. 2) containing a gene sequence—U7-snRNA gene expression cassette backbone (5'-mouse U7 promoter-smOPT sequence-U7 snRNA scaffold-snRNA gene-specific 3'box-3') was synthesized by whole gene synthesis. Two Type IIs restriction enzyme recognition sites were added between a U7 promoter and smOPT to facilitate subsequent excision, substitution, and insertion of other recognition domain sequences. The snRNA gene-specific 3' box was a sequence of gtctacaatgaaa (SEQ ID NO: 32) at the end a 3' end of a U7-snRNA gene in a mouse genome (GenBank: X54748.1), which participated in the processing of pre-snRNA; preferably, a sequence linked to the end of the 3' end of the U7 snRNA gene; and preferably, a gene fragment having a sequence length of 28-131 bp, preferably a sequence length of 106 bp.

2. Construction of U7-snRNA vector that targets Exon 13 in USH2A and different sites near Exon 13.

In this example, a total of twenty-one target sites were set for seven target regions of USH2A pre-mRNA, and the seven target regions of USH2A pre-mRNA were shown below.

```
Exon 13 region 1 (SEQ ID NO: 1) (Chr1: 216247142-216247185):
CGAAGCUUUAAUGAUGUUGGAUGUGAGCCCUGCCAGUGUAACCU;

Exon 13 region 2 (SEQ ID NO: 2) (Chr1: 216247130-216247161):
GAGCCCUGCCAGUGUAACCUCCAUGGCUCAGU;

Exon 13 region 3 (SEQ ID NO: 3) (Chr1: 216246616-216246649):
AAUCAGUGGCCAGUGCCUGUGUGUGCCUAAUCGU;

Exon 13 region 4 (SEQ ID NO: 4) (Chr1: 216247213-216247246):
UAAAUAUAUUUUAUCUUUAGGGCUUAGGUGUGAU;

Exon 13 region 5 (SEQ ID NO: 5) (Chr1: 216247204-216247232):
CUUUAGGGCUUAGGUGUGAUCAUUGCAAU;
```

-continued

Exon 13 region 6 (SEQ ID NO: 6) (Chr1: 216247187-216247220):
GGUGUGAUCAUUGCAAUUUUGGAUUUAAAUUUCU;

Exon 13 region 7 (SEQ ID NO: 7) (Chr1: 216247169-216247202):
UUGGAUUUAAAUUUCUCCGAAGCUUUAAUGAUGU.

The twenty-one target sites were shown in the table below.

TABLE 1

Recognition domain sequence of snRNA

| Serial No. | snRNA No. | Recognition domain sequence (5'-3') | Genomic location corresponding to the target site of USH2A Pre-mRNA | Target region |
|---|---|---|---|---|
| SEQ ID NO: 8 | #1 | AGCCCUAAAGAUAAAAUAUAUUUA | Chr1: 216247223-216247246 | Region 4 |
| SEQ ID NO: 9 | #2 | ACCUAAGCCCUAAAGAUAAAAUAU | Chr1: 216247218-216247241 | Region 4 |
| SEQ ID NO: 10 | #3 | AUCACACCUAAGCCCUAAAGAUAA | Chr1: 216247213-216247236 | Region 4 |
| SEQ ID NO: 11 | #4 | AAUGAUCACACCUAAGCCCUAAAG | Chr1: 216247209-216247232 | Region 5 |
| SEQ ID NO: 12 | #5 | AUUGCAAUGAUCACACCUAAGCCC | Chr1: 216247204-216247227 | Region 5 |
| SEQ ID NO: 13 | #6 | AUCCAAAAUUGCAAUGAUCACACC | Chr1: 216247197-216247220 | Region 6 |
| SEQ ID NO: 14 | #7 | AUUUAAAUCCAAAAUUGCAAUGAU | Chr1: 216247191-216247214 | Region 6 |
| SEQ ID NO: 15 | #8 | AGAAAUUUAAAUCCAAAAUUGCAA | Chr1: 216247187-216247210 | Region 6 |
| SEQ ID NO: 16 | #9 | AGCUUCGGAGAAAUUUAAAUCCAA | Chr1: 216247179-216247202 | Region 7 |
| SEQ ID NO: 17 | #10 | AUUAAAGCUUCGGAGAAAUUUAAA | Chr1: 216247174-216247197 | Region 7 |
| SEQ ID NO: 18 | #11 | ACAUCAUUAAAGCUUCGGAGAAAU | Chr1: 216247169-216247192 | Region 7 |
| SEQ ID NO: 19 | #12 | ACAUCCAACAUCAUUAAAGCUUCG | Chr1: 216247162-216247185 | Region 1 |
| SEQ ID NO: 20 | #13 | AGGGCUCACAUCCAACAUCAUUAA | Chr1: 216247155-216247178 | Region 1 |
| SEQ ID NO: 21 | #14 | ACACUGGCAGGGCUCACAUCCA | Chr1: 216247147-216247168 | Region 1 |
| SEQ ID NO: 22 | #15 | ACACUGGCAGGGCUCACAUCCAACAUC | Chr1: 216247147-216247173 | Region 1 |

TABLE 1-continued

Recognition domain sequence of snRNA

| Serial No. | snRNA No. | Recognition domain sequence (5'-3') | Genomic location corresponding to the target site of USH2A Pre-mRNA | Target region |
|---|---|---|---|---|
| SEQ ID NO: 23 | #16 | AGGUUACACUGGCA GGGCUCACAU | Chr1: 216247142-216247165 | Region 1 |
| SEQ ID NO: 24 | #17 | AUGGAGGUUACACU GGCAGGGCUC | Chr1: 216247138-216247161 | Region 2 |
| SEQ ID NO: 25 | #18 | ACUGAGCCAUGGAG GUUACACUGG | Chr1: 216247130-216247153 | Region 2 |
| SEQ ID NO: 26 | #19 | ACACACAGGCACUG GCCACUGAUU | Chr1: 216246626-216246649 | Region 3 |
| SEQ ID NO: 27 | #20 | AGGCACACACAGGC ACUGGCCACU | Chr1: 216246622-216246645 | Region 3 |
| SEQ ID NO: 28 | #21 | ACGAUUAGGCACAC ACAGGCACUG | Chr1: 216246616-216246639 | Region 3 |
| SEQ ID NO: 48 | #24 | ACCUUCUUCCUUGA CGAUUAGGCA | Chr1: 216246603-216246626 | Region 3' |
| SEQ ID NO: 29 | Scramble | AGGUGUAGUCGACC AUCGUG | No matching target sequence in humans and mice, negative control | Control |

Example 2

Chemical synthesis and modification of U7-snRNA.

Similar to oligonucleotides, U7-snRNAs could also be chemically synthesized directly to produce RNA containing a recognition domain, smOPT, and a U7-snRNA scaffold. U7-snRNAs synthesized in vitro could be specifically modified to be tolerant to nuclease degradation or to increase the affinity for a target sequence.

In this example, U7-snRNA was chemically synthesized with 2'methoxy(2'-OME) modification and phosphorothioated modification at three bases at 5' and 3' ends, thereby increasing the nuclease resistance. Taking snRNA #16 and snRNA #15 as examples, the chemically synthesized snRNA sequences and modifications were as follows (* represented a phosphorothioated backbone, m represented 2'-methoxyl modification, an underline represented a recognition domain in reversely complementary pairing with the target sequence, and an italic represented a smOPT sequence):

Chemically Synthesized and Modified U7-snRNA #16:

(SEQ ID NO: 64)
5'-mA*mG*mG*UUACACUGGCAGGGCUCACAUAAUUUUUGGAGCAGGU

UUUCUGACUUCGGUCGGAAAACCmC*mC*mU*-3'.

Based on the sequence shown in SEQ ID NO: 33, thiophosphorylated backbone modification and methoxyl modification were added to the first three bases at the 5' and 3' ends in the modified sequence;

Chemically Synthesized and Modified U7-snRNA #15:

(SEQ ID NO: 65)
5'-mA*mC*mA*CUGGCAGGGCUCACAUCCAACAUCAAUUUUUGGAGCA

GGUUUUCUGACUUCGGUCGGAAAACCmC*mC*mU*-3'.

Based on the sequence shown in SEQ ID NO: 34, thiophosphorylated backbone modification and methoxyl modification were added to the first three bases at the 5' and 3' ends in the modified sequence.

Example 3

A reporter vector was constructed to quantitatively evaluate the splicing skipping efficiency of Exon 13 in USH2A.

An $RG_{left}$-USH2A EXON13$^{mut}$-$RG_{right}$ sequence (a 5' end and a 3' end were added to AgeI and EcoRI digestion sites, respectively) was acquired by whole gene synthesis; and a synthesized sequence was inserted between AgeI and EcoRI digestion sites of a pX601 vector by performing restriction enzyme AgeI and EcoRI digestion, electrophoresis, gel cutting and recovery, and binding on the synthesized sequence and a pX601 plasmid (Addgene, 61591), in order to replace a SaCas9 gene sequence of an original vector, thereby obtaining a reporter vector. Further, a purified reporter vector plasmid was obtained by transformation of E. coli competent cells, monoclonal screening, PCR and sequencing verification, and was stored at −20° C. for later use.

Figure 3:
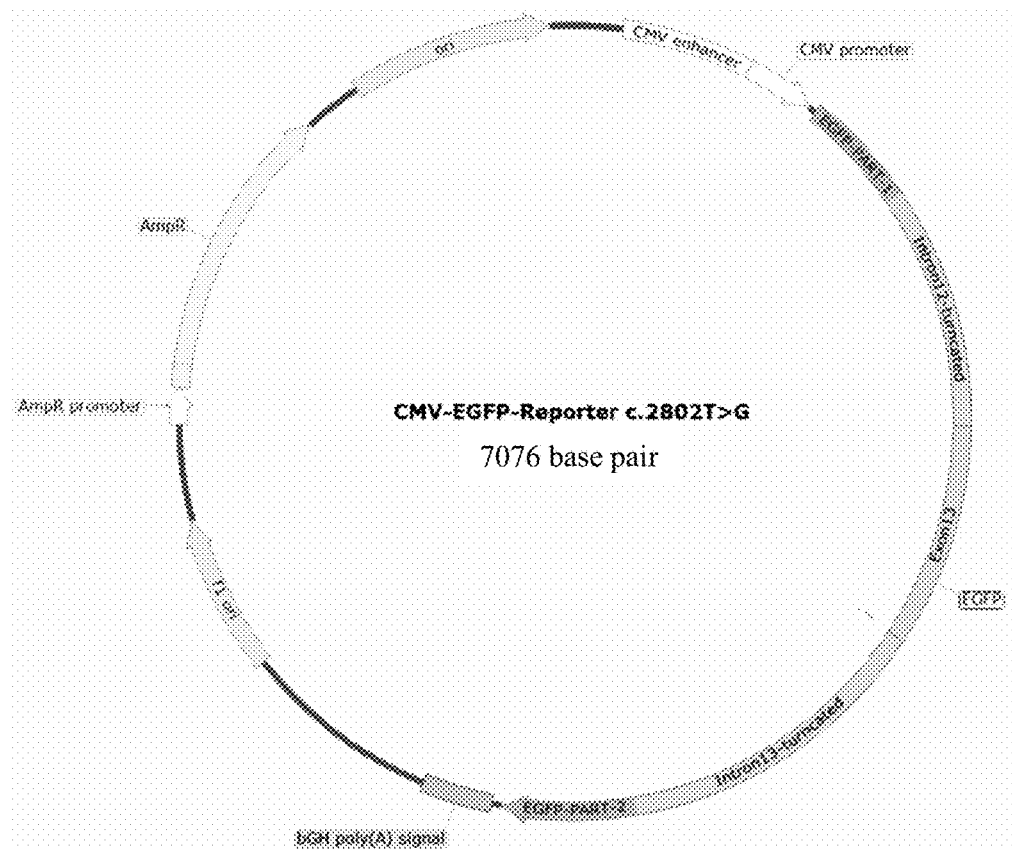
FIG. 3 is a plasmid map of a reporter vector pCMV-EGFP$_{left}$-Exon13$^{c.2802T>G}$-EGFP$_{right}$.
Figure 4:
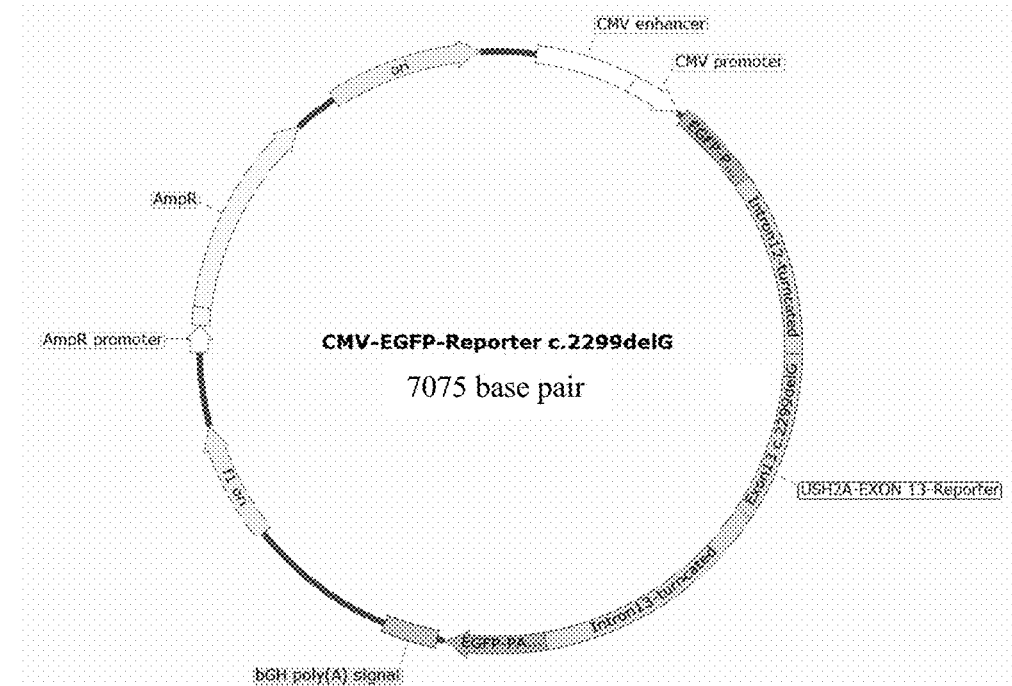
FIG. 4 is a plasmid map of a reporter vector pCMV-EGFP$_{left}$-Exon13$^{c.2299delG}$-EGFP$_{right}$.

The reporter vector had a structure as follows: pCMV-$RG_{left}$-USH2A EXON13$^{mut}$-$RG_{right}$; RG represented a reporter gene; $RG_{left}$ represented the first half of a 5' end of the reporter gene without a reporting function; $RG_{right}$ represented the second half of a 3' end of the reporter gene without a reporting function; and the tandem expression of RG$_{left}$ and RG$_{right}$ could normally perform a complete reporter gene function. In this example, the reporter gene was a green fluorescent gene EGFP, and the vector had a structure of pCMV-EGFP$_{left}$-Exon13$^{mut}$-EGFP$_{right}$. EXON13$^{mut}$ represented USH2A Exon 13 containing a pathogenic mutation, as well as upstream and downstream intron sequences (the upstream intron sequence was a tandem gene sequence of 204 bp at a 5' end and 490 bp at a 3' end of Intron 12 in a human USH2A gene; and the downstream intron sequence was a tandem gene sequence of 703 bp at a 5' end and 216 bp at a 3' end of Intron 13 in human USH2A). The pathogenic mutations in the USH2A Exon 13 may comprise c.2802T>G, c.2299delG, c.2276G>T, c.2522C>A, c.2242C>T, c.2541C>A, c.2761delC or c.2776C>T, etc. In this example of the present invention, the pathogenic mutations of the USH2A Exon 13 in this example of the present invention were c.2802T>G, and c.2299delG. That is, the vector structures obtained were pCMV-EGFP$_{left}$-Exon13$^{c.2802T>G}$-EGFP$_{right}$ (a map of the reporter vector was shown in FIG. 3), and pCMV-EGFP$_{left}$-Exon13$^{c.2299delG}$-EGFP$_{right}$ (a map of the reporter vector was shown in FIG. 4), wherein the EGFP$_{left}$ sequence was shown as SEQ ID NO: 35 and the EGFP$_{right}$ sequence was shown as SEQ ID NO: 36.

Example 4

Detection of splicing skipping effect of USH2A Exon 13 mediated by U7-snRNA that targeted the target region 1.

Figure 5:
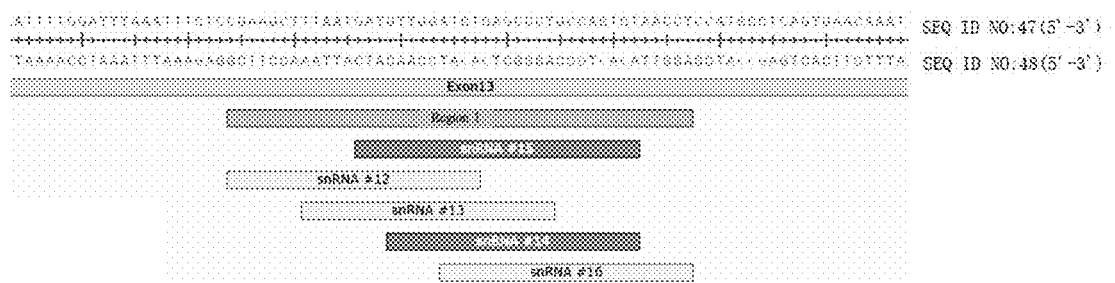
FIG. 5 is a schematic diagram of a location of U7-snRNA that targets the target region 1 on a genome.

Detection method: 293T cells were inoculated into a 24-well plate in a certain amount so that the cell confluence reached about 80% after 24 h. Lipofectamine™ 2000 was selected to co-transfect 293 T cells (a vector mass ratio of 100 ng:400 ng) with pCMV-EGFP$_{left}$-Exon13$^{c.2802T>G}$-EGFP$_{right}$ and pUC57-U7-snRNA plasmid targeting USH2A pre-mRNA. 293T cells transfected with reporter plasmids alone and 293T cells co-transfected with reporter plasmids and pUC57-U7-con were respectively used as two negative controls, and 293T cells without any plasmid transfection were used as a blank control. The transfected cells continued to be cultured for 48-72 h, and trypsinized into single cells. A flow cytometer was then used to detect GFP-positive rates (i.e., proportions of cells in which Exon 13 in USH2A pre-mRNA was induced to splicing skipping) of different U7-snRNA groups and mean FITC intensity of GFP-positive cells (i.e., a mean level of splicing skipping of Exon 13 in USH2A pre-mRNA in GFP cells). A location of the U7-snRNA that targeted the target region 1 on the genome (a picture from left to right corresponded to a 5' end to a 3' end in the genome) was shown in FIG. 5.

Figure 6:
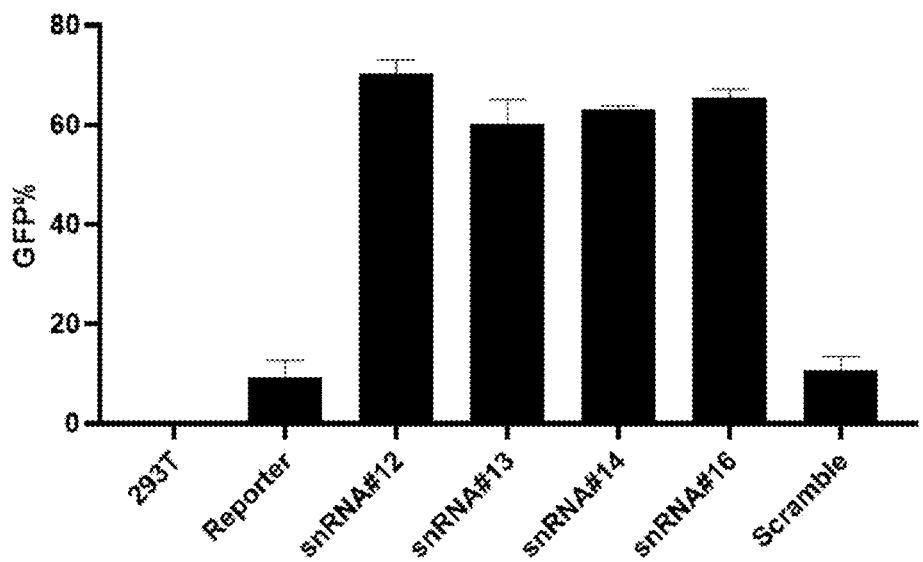
FIG. 6 is a result diagram of a proportion of cells in which U7-snRNA that targets the target region 1 induces splicing skipping of Exon 13 in USH2A pre-mRNA in reporter vector cells.

Experimental results: as shown in FIG. 6 and the table below, all U7-snRNAs that targeted the target region 1 were able to induce splicing skipping of USH2A Exon 13 in reporter cells. AON in the prior art that targeted this region 1 could not induce splicing skipping of Exon 13, but snRNA that targeted this region 1 could efficiently induce splicing skipping of Exon 13.

TABLE 2

The proportion of cells in which U7-snRNAs targeting the target region 1 induced splicing skipping of USH2A pre-mRNA Exon 13 in reporter cells

| | GFP-positive rate | | |
|---|---|---|---|
| Sample name | Round 1 | Round 2 | Round 3 |
| 293T | 0.1% | 0.1% | 0.1% |
| Reporter | 9.2% | 12.8% | 6.1% |
| snRNA#12 | 71.10% | 67.30% | 72.60% |
| snRNA#13 | 64.80% | 60.80% | 55.20% |
| snRNA#14 | 62.30% | 63.30% | 63.70% |
| snRNA#16 | 65.20% | 67.30% | 64.20% |
| Scramble | 11.00% | 13.30% | 7.70% |

Example 5

Detection of splicing skipping effect of USH2A Exon 13 mediated by U7-snRNA that targeted the target region 2.

Figure 8:
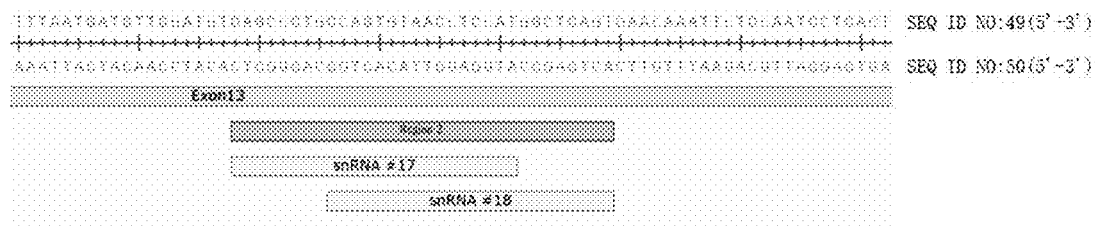
FIG. 8 is a schematic diagram of a location of U7-snRNA that targets the target region 2 on a genome.

Detection method: the same as in Example 4, a location of the U7-snRNA that targeted the target region 2 on a genome (a picture from left to right corresponded to a 5' end to a 3' end of the genome) was shown in FIG. 8.

Figure 9:
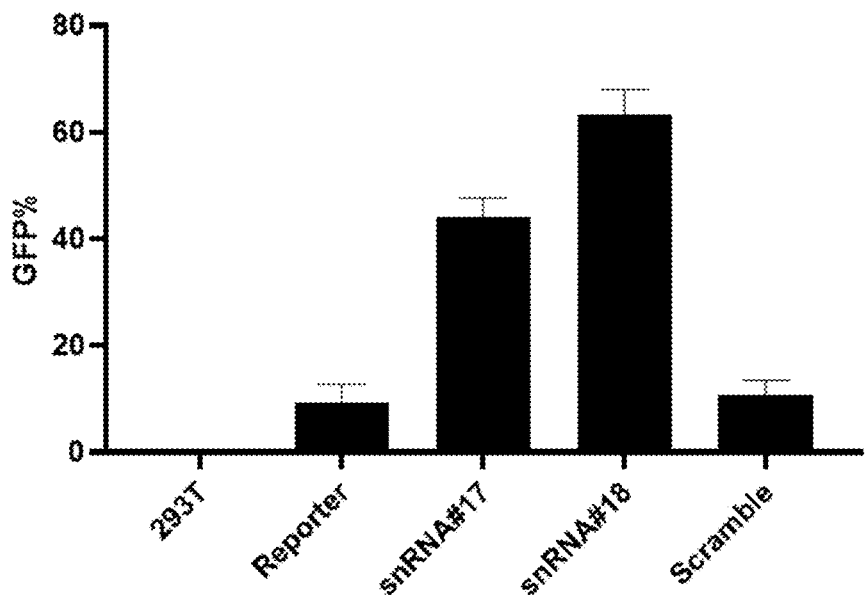
FIG. 9 is a result diagram of a proportion of cells in which U7-snRNA that targets the target region 2 induces splicing skipping of Exon 13 in USH2A pre-mRNA in reporter vector cells.

Experimental results: as shown in FIG. 9 and the table below, all U7-snRNAs that targeted the target region 2 were able to induce splicing skipping of USH2A Exon 13 in reporter cells. AON that targeted this region 2 could not efficiently induce splicing skipping of Exon 13 in the prior art, but snRNA that targeted this region 2 could efficiently induce splicing skipping of Exon 13.

TABLE 3

The proportion of cells in which U7-snRNAs targeting the target region 2 induced splicing skipping of USH2A pre-mRNA Exon 13 in reporter cells

| | GFP-positive rate | | |
|---|---|---|---|
| Sample name | Round 1 | Round 2 | Round 3 |
| 293T | 0.1% | 0.1% | 0.1% |
| Reporter | 9.2% | 12.8% | 6.1% |
| snRNA#17 | 43.50% | 47.90% | 40.90% |
| snRNA#18 | 58.50% | 67.80% | 63.80% |
| Scramble | 11.00% | 13.30% | 7.70% |

Example 6

Detection of splicing skipping effect of USH2A Exon 13 mediated by U7-snRNA that targeted the target region 3.

Figure 11:
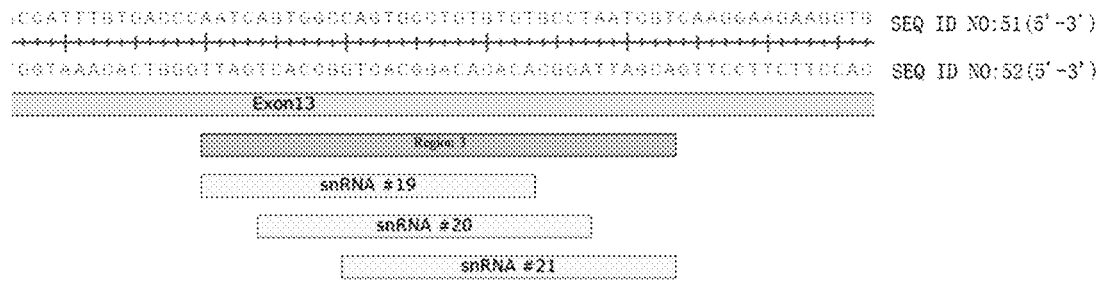
FIG. 11 is a schematic diagram of a location of U7-snRNA that targets the target region 3 on a genome.

Detection method: the same as in Example 4, a location of the U7-snRNA that targeted the target region 3 on a genome (a picture from left to right corresponded to a 5' end to a 3' end of the genome) was shown in FIG. 11.

Figure 12:
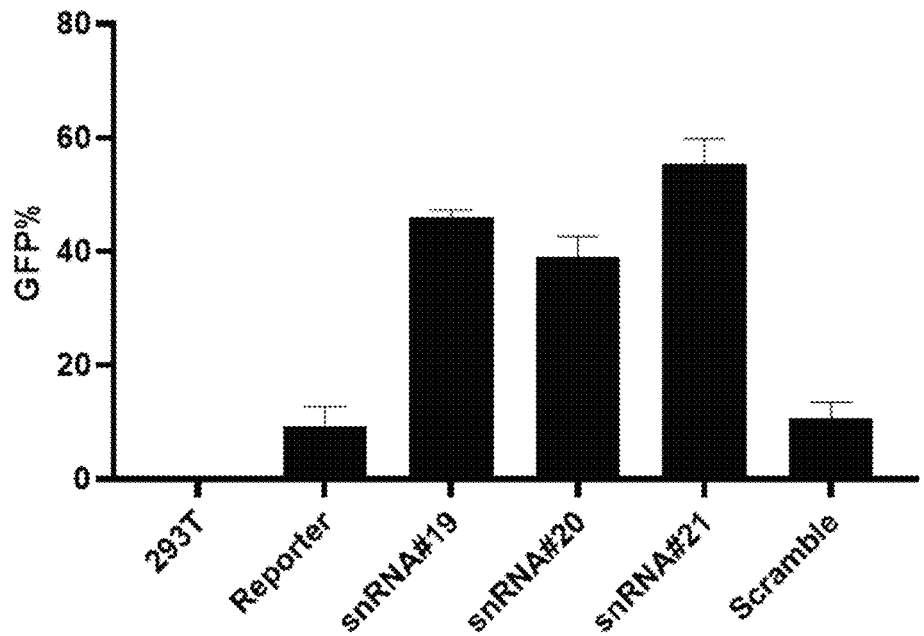
FIG. 12 is a result diagram of a proportion of cells in which U7-snRNA that targets the target region 3 induces splicing skipping of Exon 13 in USH2A pre-mRNA in reporter vector cells.

Experimental results: as shown in FIG. 12 and the table below, all U7-snRNAs that targeted the target region 3 were able to induce splicing skipping of USH2A Exon 13 in reporter cells. AON that targeted this region 3 could not efficiently induce splicing skipping of Exon 13 in the prior art, but snRNA that targeted this region 3 could efficiently induce splicing skipping of Exon 13.

TABLE 4

The proportion of cells in which U7-snRNAs targeting
the target region 3 induced splicing skipping
of USH2A pre-mRNA Exon 13 in reporter cells

| | GFP-positive rate | | |
|---|---|---|---|
| Sample name | Round 1 | Round 2 | Round 3 |
| 293T | 0.1% | 0.1% | 0.1% |
| Reporter | 9.2% | 12.8% | 6.1% |
| snRNA#19 | 44.70% | 47.40% | 45.80% |
| snRNA#20 | 43.10% | 36.40% | 37.80% |
| snRNA#21 | 50.40% | 56.50% | 59.10% |
| Scramble | 11.00% | 13.30% | 7.70% |

In combination with the analysis of Examples 4, 5 and 6, it was found that although the prior art showed that the target regions 1, 2 and 3 were non-sensitive regions targeted by AON, that is, targeting this region could not induce/inefficiently induce splicing skipping of Exon 13, the snRNA targeting this region could significantly induce the skipping splicing of Exon 13. Thus, although both snRNA and AON could induce splicing skipping, they had different action mechanisms and different target site sensitivity (target sites in the target region to which they apply).

Figure 7:
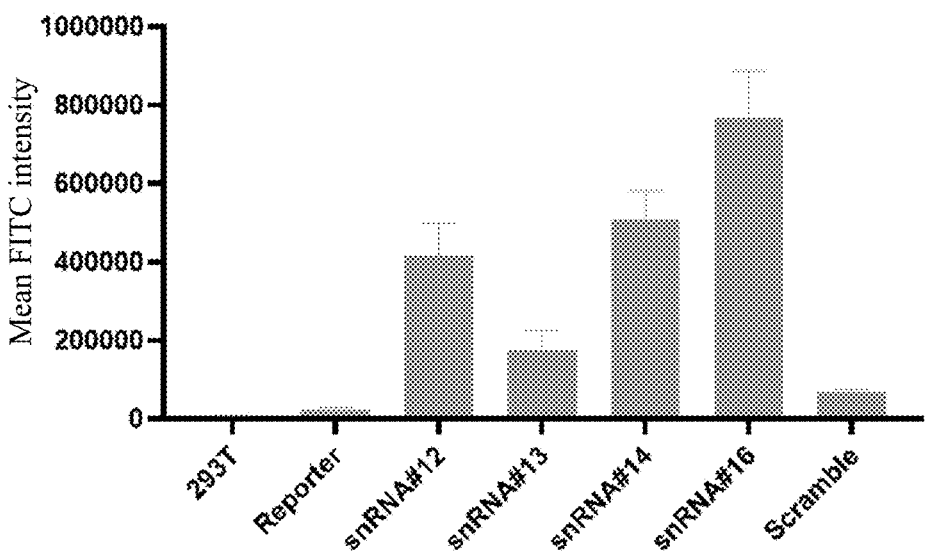
FIG. 7 is a histogram of a mean FITC intensity of GFP-positive cells (splicing skipping of Exon 13 in USH2A pre-mRNA) induced by U7-snRNA that targets the target region 1.
Figure 10:
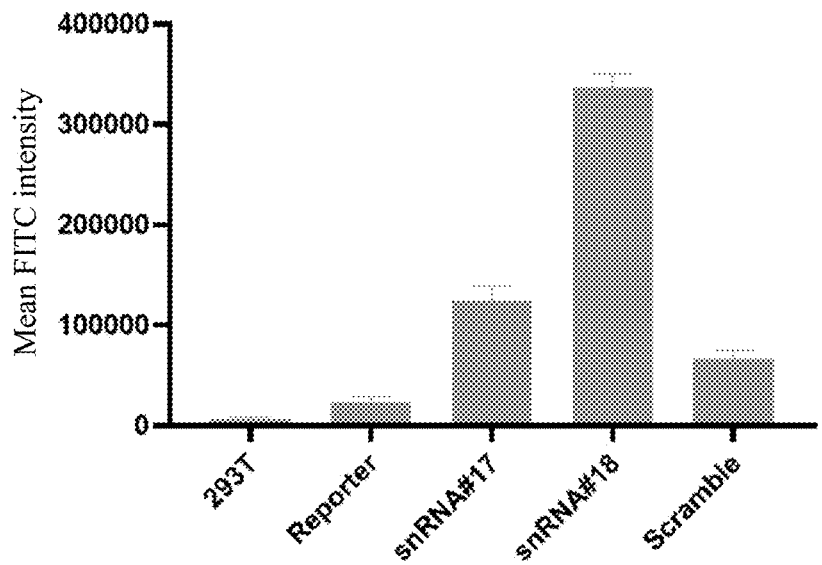
FIG. 10 is a histogram of mean FITC intensities of GFP-positive cells (splicing skipping of Exon 13 in USH2A pre-mRNA) induced by U7-snRNA in the target region 2.
Figure 13:
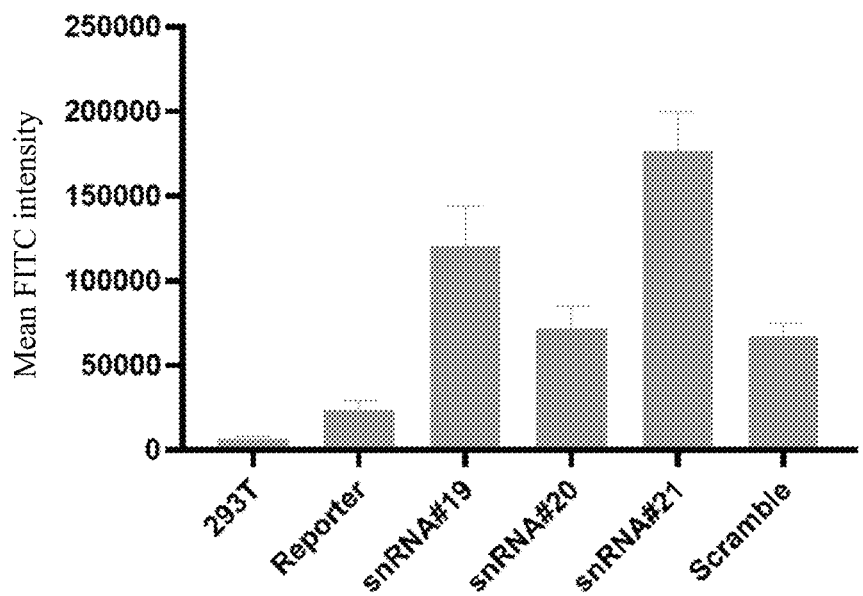
FIG. 13 is a histogram of mean FITC intensities of GFP-positive cells (splicing skipping of Exon 13 in USH2A pre-mRNA) induced by U7-snRNA that targets the target region 3.

Meanwhile, as shown in FIG. 7, FIG. 10, FIG. 13 and a table below, although proportions of cells (GFP %) that target the same region and induce splicing skipping were similar, the levels of mRNAs and their proteins for splicing skipping (mean FITC intensity), which were obtained by inducing snRNAs that targeted different targets in the same region, were different. Moreover, the levels of mRNAs and their proteins for splicing skipping, which were obtained by inducing the target region 1 and the target region 2 in the same cell were superior to that of the target region 3.

TABLE 5

Mean FITC intensity of GFP-positive cells induced
by U7-snRNAs targeting the target region 1, 2,
3 (splicing skipping of USH2A pre-mRNA Exon 13)

| | Mean FITC intensity | | |
|---|---|---|---|
| Sample name | Round 1 | Round 2 | Round 3 |
| 293T | 6366 | 5100 | 8240 |
| Reporter | 23925 | 28917 | 17335 |
| snRNA#12 | 486351 | 326693 | 437187 |
| snRNA#13 | 232257 | 158859 | 132083 |
| snRNA#14 | 574041 | 428688 | 521495 |
| snRNA#16 | 895368 | 656932 | 746482 |
| snRNA#17 | 141587 | 113914 | 118049 |
| snRNA#18 | 348154 | 321381 | 340581 |
| snRNA#19 | 127942 | 94695 | 139515 |
| snRNA#20 | 83206 | 57570 | 75303 |
| snRNA#21 | 191259 | 150479 | 188522 |
| Scramble | 58920 | 75279 | 66826 |

Example 7

Detection of splicing skipping effect of USH2A Exon 13 mediated by U7-snRNA and snRNA #24 that targeted the target region 4.

Figure 14:
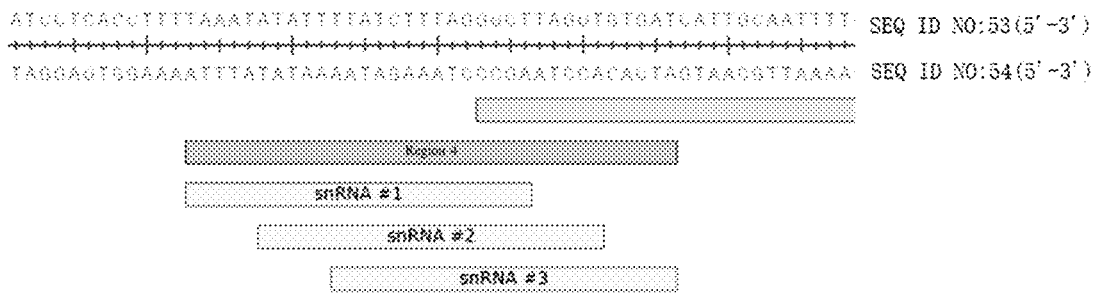
FIG. 14 is a schematic diagram of a location of U7-snRNA that targets the target region 4 on a genome.

Detection method: the same as in Example 4, a location of the U7-snRNA that targeted the target region 4 on a genome (a picture from left to right corresponded to a 5' end to a 3' end of the genome) was shown in FIG. 14.

Figure 15:
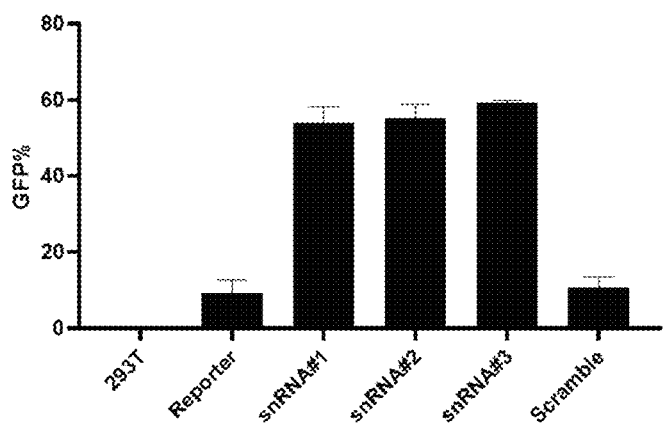
FIG. 15 is a result diagram of a proportion of cells in which U7-snRNA that targets the target region 4 induces splicing skipping of Exon 13 in USH2A pre-mRNA in reporter vector cells.

Experimental results: as shown in FIG. 15 and the table below, all U7-snRNAs that targeted the target region 4 were able to induce splicing skipping of USH2A Exon 13 in reporter cells.

TABLE 6

The proportion of cells in which U7-snRNAs targeting
the target region 4 induced splicing skipping
of USH2A pre-mRNA Exon 13 in reporter cells

| | GFP-positive rate | | |
|---|---|---|---|
| Sample name | Round 1 | Round 2 | Round 3 |
| 293T | 0.10% | 0.10% | 0.10% |
| Reporter | 9.20% | 12.80% | 6.10% |
| snRNA#1 | 50.30% | 58.70% | 52.50% |
| snRNA#2 | 53.20% | 59.40% | 52.90% |
| snRNA#3 | 59.00% | 59.90% | 58.70% |
| snRNA#24 | 55.70% | 59.10% | 59.30% |
| Scramble | 11.00% | 13.30% | 7.70% |

Example 8

Detection of splicing skipping effect of USH2A Exon 13 mediated by U7-snRNA that targeted the target region 5.

Figure 16:
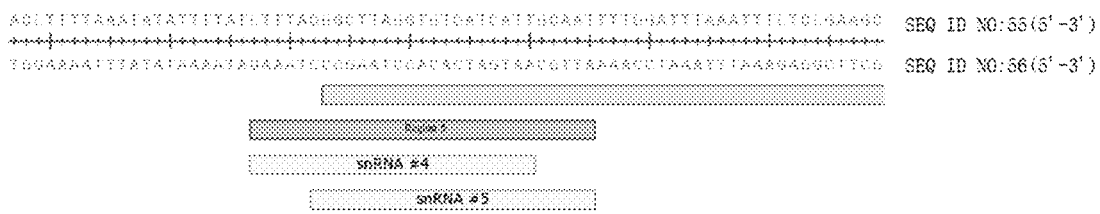
FIG. 16 is a schematic diagram of a location of U7-snRNA that targets the target region 5 on a genome.

Detection method: the same as in Example 4, a location of the U7-snRNA that targeted the target region 5 on a genome (a picture from left to right corresponded to a 5' end to a 3' end of the genome) was shown in FIG. 16.

Figure 17:
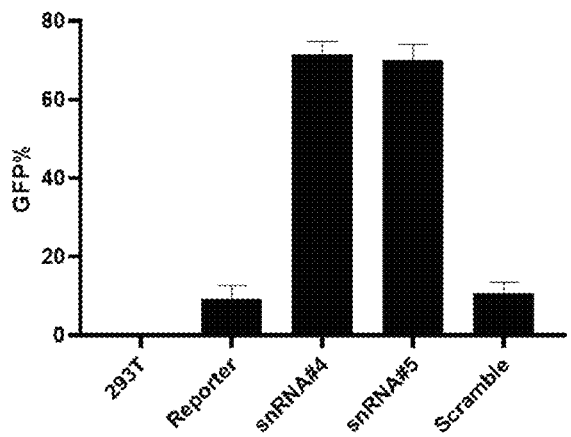
FIG. 17 is a result diagram of a proportion of cells in which U7-snRNA that targets the target region 5 induces splicing skipping of Exon 13 in USH2A pre-mRNA in reporter vector cells.

Experimental results: as shown in FIG. 17 and the table below, all U7-snRNAs that targeted the target region 5 were able to induce splicing skipping of USH2A Exon 13 in reporter cells.

TABLE 7

The proportion of cells in which U7-snRNAs targeting
the target region 5 induced splicing skipping
of USH2A pre-mRNA Exon 13 in reporter cells

| | GFP-positive rate | | |
|---|---|---|---|
| Sample name | Round 1 | Round 2 | Round 3 |
| 293T | 0.1% | 0.1% | 0.1% |
| Reporter | 9.2% | 12.8% | 6.1% |
| snRNA#4 | 67.70% | 74.30% | 72.10% |
| snRNA#5 | 67.90% | 67.80% | 74.60% |
| Scramble | 11.00% | 13.30% | 7.70% |

Example 9

Detection of splicing skipping effect of USH2A Exon 13 mediated by U7-snRNA that targeted the target region 6.

Figure 18:
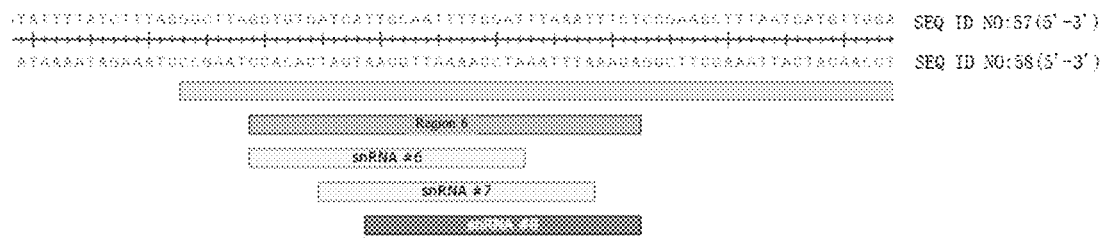
FIG. 18 is a schematic diagram of a location of U7-snRNA that targets the target region 6 on a genome.

Detection method: the same as in Example 4, a location of the U7-snRNA that targeted the target region 6 on a genome (a picture from left to right corresponds to a 5' end to a 3' end of the genome) was shown in FIG. 18.

Figure 19:
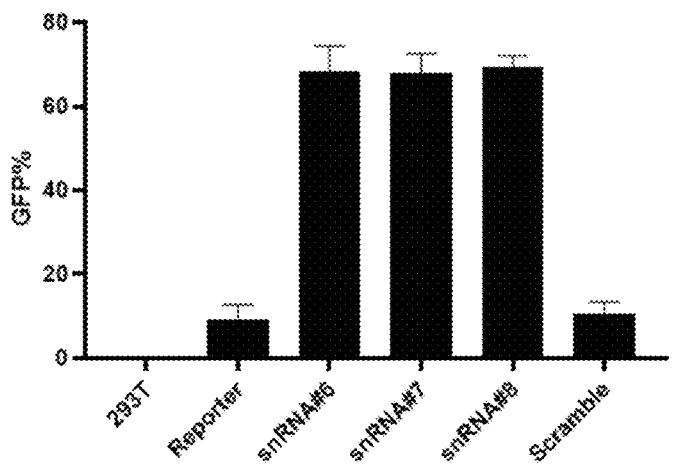
FIG. 19 is a result diagram of a proportion of cells in which U7-snRNA that targets the target region 6 induces splicing skipping of Exon 13 in USH2A pre-mRNA in reporter vector cells.

Experimental results: as shown in FIG. 19 and the table below, all U7-snRNAs that targeted the target region 6 were able to induce splicing skipping of USH2A Exon 13 in reporter cells.

TABLE 8

The proportion of cells in which U7-snRNAs targeting
the target region 6 induced splicing skipping
of USH2A pre-mRNA Exon 13 in reporter cells

| | GFP-positive rate | | |
|---|---|---|---|
| Sample name | Round 1 | Round 2 | Round 3 |
| 293T | 0.10% | 0.10% | 0.10% |
| Reporter | 9.20% | 12.80% | 6.10% |
| snRNA#6 | 71.40% | 61.30% | 72.20% |

TABLE 8-continued

The proportion of cells in which U7-snRNAs targeting the target region 6 induced splicing skipping of USH2A pre-mRNA Exon 13 in reporter cells

| Sample name | GFP-positive rate | | |
|---|---|---|---|
| | Round 1 | Round 2 | Round 3 |
| snRNA#7 | 64.50% | 73.10% | 66.50% |
| snRNA#8 | 66.50% | 70.80% | 71.10% |
| Scramble | 11.00% | 13.30% | 7.70% |

Example 10

Detection of splicing skipping effect of USH2A Exon 13 mediated by U7-snRNA that targeted the target region 7.

Figure 20:
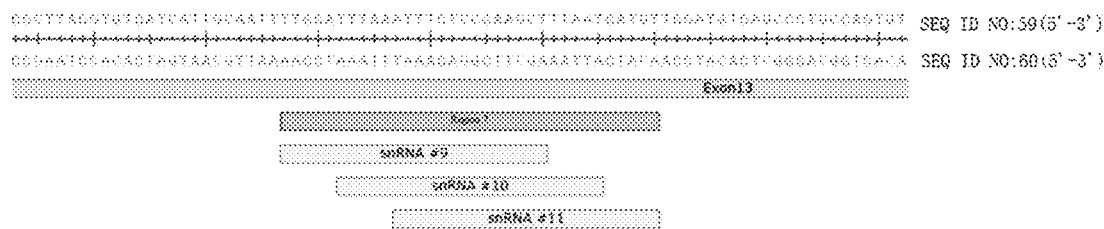
FIG. 20 is a schematic diagram of a location of U7-snRNA that targets the target region 7 on a genome.

Detection method: the same as in Example 4, a location of the U7-snRNA that targeted the target region 5 on a genome (a picture from left to right corresponded to a 5' end to a 3' end of the genome) was shown in FIG. 20.

Figure 21:
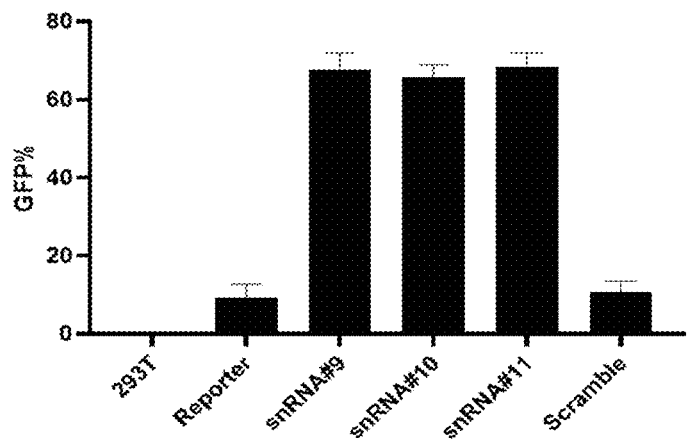
FIG. 21 is a result diagram of a proportion of cells in which U7-snRNA that targets the target region 7 induces splicing skipping of Exon 13 in USH2A pre-mRNA in reporter vector cells.

Experimental results: as shown in FIG. 21 and the table below, all U7-snRNAs that targeted the target region 7 were able to induce splicing skipping of USH2A Exon 13 in reporter cells.

TABLE 9

The proportion of cells in which U7-snRNAs targeting the target region 7 induced splicing skipping of USH2A pre-mRNA Exon 13 in reporter cells

| Sample name | GFP-positive rate | | |
|---|---|---|---|
| | Round 1 | Round 2 | Round 3 |
| 293T | 0.10% | 0.10% | 0.10% |
| Reporter | 9.20% | 12.80% | 6.10% |
| snRNA#9 | 62.50% | 69.80% | 70.30% |
| snRNA#10 | 62.90% | 64.70% | 69.30% |
| snRNA#11 | 65.80% | 67.00% | 72.40% |
| Scramble | 11.00% | 13.30% | 7.70% |

Example 11

Detection of splicing skipping effect of USH2A Exon 13 mediated by U7-snRNA.

Verification method: the same as in Example 4.

Figure 22:
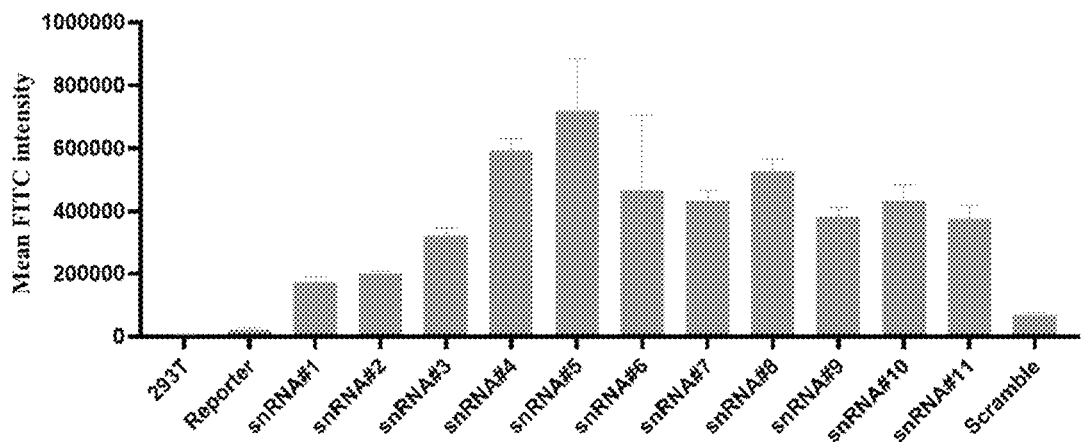
FIG. 22 is a result diagram of mean FITC intensities of U7 snRNA that targets different regions and induces splicing skipping of Exon 13 in USH2A pre-mRNA in reporter vector cells.

Experimental results: the mean FITC intensities of GFP-positive cells induced by U7-snRNA in different regions were shown in FIG. 22 and the table below.

TABLE 10

Mean FITC intensity of U7-snRNAs targeting different target regions induce splicing skipping of USH2A Exon 13 in reporter cells

| Sample name | Mean FITC intensity | | |
|---|---|---|---|
| | Round 1 | Round 2 | Round 3 |
| 293T | 6366 | 5100 | 8240 |
| Reporter | 23925 | 28917 | 17335 |
| snRNA#1 | 173453 | 155132 | 187790 |
| snRNA#2 | 206250 | 189836 | 202251 |
| snRNA#3 | 326133 | 290451 | 341559 |
| snRNA#4 | 597519 | 630198 | 554593 |
| snRNA#5 | 860189 | 533418 | 759756 |
| snRNA#6 | 635438 | 192090 | 573484 |
| snRNA#7 | 464705 | 437438 | 403231 |
| snRNA#8 | 506956 | 570141 | 504600 |

TABLE 10-continued

Mean FITC intensity of U7-snRNAs targeting different target regions induce splicing skipping of USH2A Exon 13 in reporter cells

| Sample name | Mean FITC intensity | | |
|---|---|---|---|
| | Round 1 | Round 2 | Round 3 |
| snRNA#9 | 416595 | 374370 | 358388 |
| snRNA#10 | 485513 | 430752 | 384956 |
| snRNA#11 | 422896 | 346341 | 361230 |
| snRNA#24 | 204635 | 198488 | 239915 |
| Scramble | 58920 | 75279 | 66826 |

Although proportions of cells (GFP %) that target the same region (the proportion of cells with induced splicing skipping) were similar, levels of mRNAs and their proteins (mean FITC intensity) for splicing skipping were obtained by induction of snRNA that targeted different targets in the same region in the same cell were different.

The target region 2 not only obtained a higher proportion of cells that induced splicing skipping (GFP %), but levels of mRNAs and their proteins (mean FITC intensity) for splicing skipping were obtained by induction in the same cell were higher.

However, target site #2 and its adjacent sites #1 and #3 with high efficiency of AON-induced splicing skipping in the prior art had lower levels of mRNAs and their proteins for splicing skipping by induction in the same cell in the snRNA system. In the prior art, the AON efficiency of the target region 3 was higher than that of the region 2, but in the snRNA system, the efficiency of the target region 2 was higher than that of the region 3. Thus, although both snRNA and AON could induce splicing skipping, they had different action mechanisms and different target site sensitivities. In combination with the analysis of the results of Example 12, since the efficiency of snRNA #24 was similar to that of snRNA #2 and AON1, it could be inferred that snRNA #3-#11 had better good effects than snRNA #2, snRNA #24 and AON1.

Example 12

Verification that the splicing skipping effect of USH2A Exon 13 mediated by U7-snRNA was significantly superior to AON.

Detection method: 293 T cells were inoculated into a 24-well plate in a certain amount so that the cell confluence reached about 80% after 24 h. Lipofectamine™ 2000 was used to co-transfect 293 T cells (a vector mass ratio of 100 ng:400 ng) with pCMV-EGFP$_{left}$-Exon13$^{c.2802T>G}$-EGFP$_{right}$ and U7-snRNA plasmids of different targets respectively. 293 T cells transfected with reporter plasmids alone and 293 T cells co-transfected with reporter plasmids and pUC57-U7 Scramble were used as two negative controls. 293 T cells co-transfected with reporter plasmids and 10 pmol antisense oligonucleotide AON1 (5'-MA*MG*MC*MU*MG*MG*MA*MA*MU*MU*MA*MU*3', "M" for 2'-O-methoxyl modification, and "*" for thiophosphorylation, SEQ ID NO: 62) were used a positive control. 293 T cells without any plasmid transfection were used as a blank control. The transfected cells were cultured for 48-72 h, and trypsinized into single cells, and a flow cytometer was then used to detect GFP-positive rates and mean FITC intensity of different snRNAs.

Figure 23:
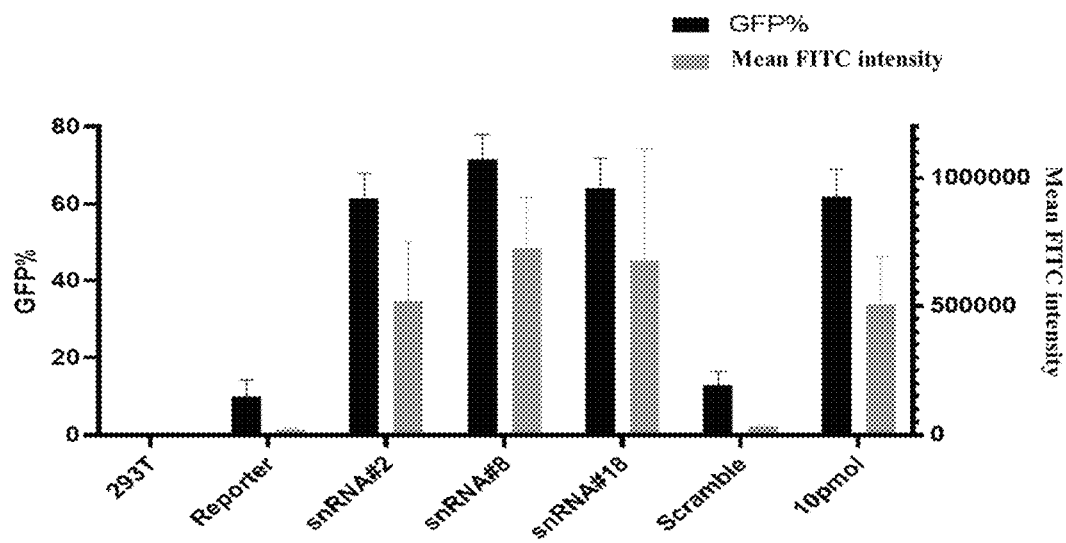
FIG. 23 is an experimental result diagram in which the splicing skipping efficiency of Exon 13 in USH2A induced by U7-snRNA is significantly higher than that of AON1.

Experimental results: as shown in FIG. 23 and the table below, snRNA #8 and snRNA #18 screened in the present invention were superior to AON1, and the efficiency of snRNA #2 was similar to that of AON1.

TABLE 11

The splicing skipping effect of USH2A pre-mRNA Exon 13 mediated by U7-snRNA was significantly superior to AON1

| Sample name | GFP-positive rate | | | Mean FITC intensity | | |
|---|---|---|---|---|---|---|
| | Round 1 | Round 2 | Round 3 | Round 1 | Round 2 | Round 3 |
| 293T | 0.10% | 0.10% | 0.10% | 5960 | 6100 | 11052 |
| Reporter | 5.10% | 11.00% | 13.50% | 19637 | 18264 | 25099 |
| snRNA#24 | 54.80% | 67.90% | 61.30% | 299833 | 495247 | 762459 |
| snRNA#8 | 68.00% | 78.90% | 67.30% | 537794 | 705890 | 934080 |
| snRNA#18 | 56.00% | 71.50% | 64.80% | 330972 | 544705 | 1166147 |
| Scramble | 8.60% | 14.40% | 15.40% | 37615 | 27557 | 41557 |
| 10 pmol AON1 | 56.70% | 69.90% | 59.20% | 473261 | 708438 | 342562 |

Example 13

Induction of splicing skipping of USH2A Exon 13 by chemically synthesized U7-snRNA in WERI cells.

Figure 24:
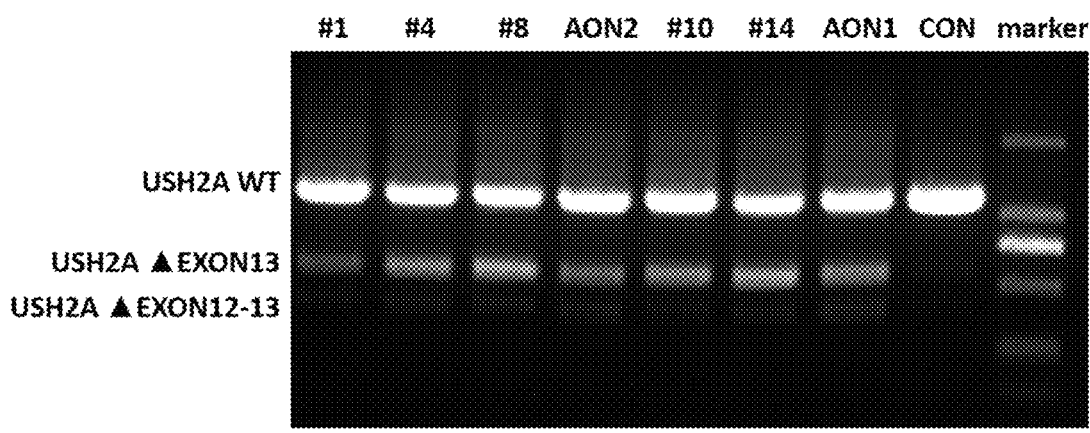
FIG. 24 is a result diagram of the efficiency of chemically synthesized U7 snRNA to induce splicing skipping of Exon 13 in USH2A pre-mRNA detected in WERI cells.

Human host cells were inoculated into a 24-well plate at $6\times10^5$ cells/well. In this example, the human retinal nerve cells selected in this example were WERI-Rb-1 cells (a retinal nerve cell line). WERI cells which were transfected with 100 pmol U7-snRNA #1, snRNA #4, snRNA #8, snRNA #10 and snRNA #14 synthesized in vitro by using Lipofectamine™ 2000 were transfected with antisense oligonucleotide AON1 (5'-MA*MG*MC*MU*MU*MC* MG*MG*MA*MG*MA*MU*MU*MA*MU*MA*M U*MC*-3', "M" for 2'-O-methoxy modification, and "*" for thiophosphorylation, SEQ ID NO: 62) and AON2 (5'-MU*MG*MA*MU*MC*MA*MC*MU*MA*MA*MG* MC*MC*MU*MA*MA*MA*MA*-3', "M" for 2'-O-methoxyl modification, and "*" for thiophosphorylation, SEQ ID NO: 63) in the same dose (100 μmol), were used as blank controls. 1 g of transfected EGFP plasmids were used as a negative control, and WERI cells without any plasmid transfection were used as a blank control. The transfected cells were cultured for 72 h, and RNA was then extracted from cells in each experimental group, and reversely transcribed to obtain cDNA. An RT-PCR experiment was performed by primers AGCCTTTCCGCCAAGGTGATC (SEQ ID NO: 37) and CACAACGTTGCCCAGCAATGG (SEQ ID NO: 38). Whether mature USH2A mRNA had Exon 13 was detected. Electrophoresis results were shown in FIG. 24.

Experimental results: in WERI cells that endogenously expressed a Usherin protein, the effect of chemically synthesized U7-snRNA to induce splicing skipping of Exon 13 in USH2A pre-mRNA was compared with an AON technical solution. The RT-PCR test data and analysis results showed that an AON single-skipping band was weaker than the snRNA, and there were more obvious double-skipping bands under the AON single-skipping band. It could thus be seen that the effects of a chemically synthesized U7-snRNA experimental group 1 and a U7-snRNA experimental group 2 to induce single splicing skipping of Exon 13 were significantly better than those of the technical solutions of AON1 and AON2. In addition, rt-PCR electrophoresis bands were further quantitatively analyzed by ImageJ software. The proportions of USH2A mRNA in double skipping of Exon 12 and Exon 13 to USH2A mRNA in total skipping (a sum of USH2A mRNAs of Exon 13, Exon 12, and Exon 13 in single skipping) were analyzed. The results showed that the proportions of U7-snRNA that induced double splicing skipping of Exon 12 and Exon 13 were very low and lower than those of AON1 and AON2. Therefore, it was determined that U7-snRNA significantly improved the efficiency of single splicing skipping of Exon 13 while ensuring a USH2A mRNA by-product with low double-skipping.

In addition, U7-snRNA #14 had a target site close to an AON site with a very high probability of double splicing skipping of Exon 12 and Exon 13 in the prior art, however, the probability of double splicing skipping of exons after U7-snRNA #14 treatment was very low. It was further proved that U7-snRNA could significantly reduce the double-skipping probability of Exon 12 and Exon 13 while inducing splicing skipping of Exon 13.

Example 14

Detection of splicing skipping effect of U7-snRNA linked with a hnRNPA1-binding motif.

1. Construction of U7-snRNA linked with the hnRNPA1-binding motif

According to a pre-transcriptional DNA sequence corresponding to a gRNA sequence in the table, the corresponding Oligo DNAs were synthesized respectively. An Oligo DNA sense strand was a reverse complementary sequence (a DNA sequence corresponding to a recognition domain sequence) of a target sequence, and 5' plus CCGCAATAT-GATAGGGACTTAGGGTG (SEQ ID NO: 39); and an antisense strand was a target sequence 5' plus AATT and 3' plus CACCCTAAGTCCCTATCATATT (SEQ ID NO: 40). For example, a recognition domain sequence of snRNA #14 was ACACUGGCAGGGCUCAUCCA (SEQ ID NO: 41); the synthesized Oligo DNA sense strand was (SEQ ID NO: 42)
CCGCAATATGATAGGGACTTAGGGTGACACUGGCAGGGCUCACAUCCA, and an antisense strand was (SEQ ID NO: 43)
AATTUGGAUGUGAGCCCUGCCAGUGUCACCCTAAGTCCCTATCATATT;

an underline indicated a DNA double-stranded sequence corresponding to the recognition domain sequence; and a bold italic indicated a DNA double-stranded sequence corresponding to a binding motif "UAGGGU" of a hnRNPA1 protein.

Figure 26:
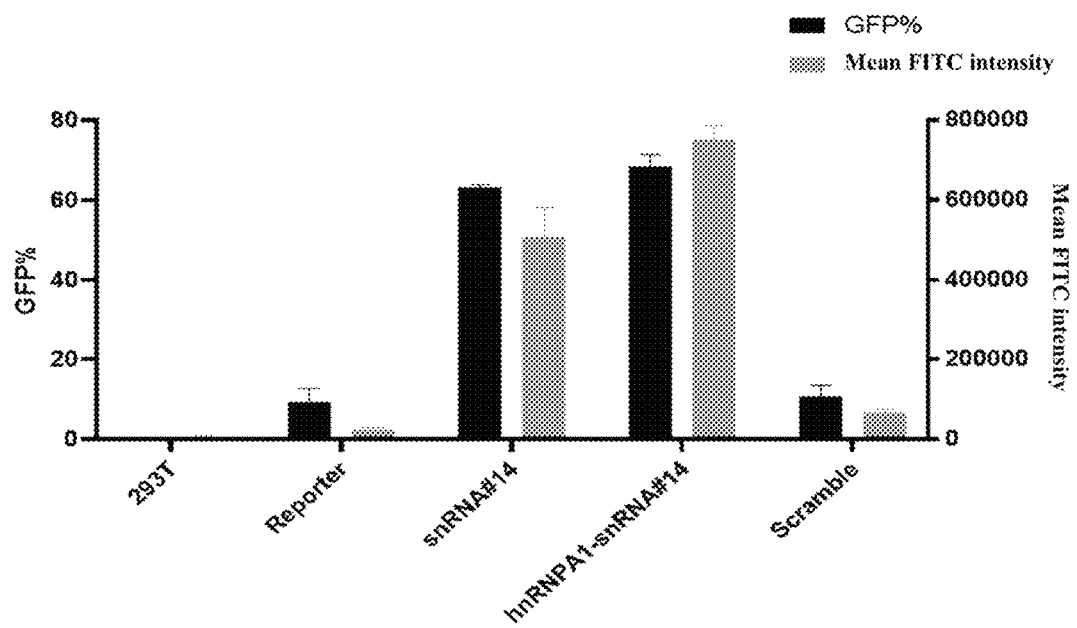
FIG. 26 is a result diagram of the efficiency of U7-hnRNPA1-snRNA to induce splicing skipping of Exon 13 in USH2A pre-mRNA.

A sense strand and an antisense strand of the synthesized Oligo DNA were mixed according to an annealing reaction system (a total reaction volume 20 μl: Oligo-F (100 μM) 2 μl+Oligo-R (100 μM) 2 μl+10×NEB Cutter smart buffer 2 μl+deionized water 16 μl), incubated at 95° C. for 5 min, then placed on ice, and cooled and annealed to form a double-stranded DNA with sticky ends. The double-stranded DNA was diluted in 100 folds, then 1 μl of the double-stranded DNA was taken, digested with 10 ng of BsaI, and linked with a recovered linearized pUC57-U7-snRNA backbone plasmid. Further, a U7-snRNA vector which contained a hnRNPA1-binding motif and was used for inducing splicing skipping of USH2A Exon 13 was obtained by conversion of competent *Escherichia coli* cells, monoclonal Experimental results: as shown in FIG. 26 and the table below, the introduction of a hnRNPA1-binding motif at a 5' end of U7-snRNA significantly increased the effect of inducing splicing skipping of Exon 13 in USH2A pre-mRNA, which not only increased a proportion of cells for splicing skipping of Exon 13 (GFP+) but also increased an mRNA level (mean FITC intensity) of splicing skipped exons in each cell.

TABLE 12

The Exon 13 splicing skipping efficiency of U7-hnRNP A1-snRNAUSH2A pre-mRNA

| Sample name | GFP-positive rate | | | Mean FITC intensity | | |
|---|---|---|---|---|---|---|
| | Round 1 | Round 2 | Round 3 | Round 1 | Round 2 | Round 3 |
| 293T | 0.10% | 0.10% | 0.10% | 6366 | 5100 | 8240 |
| Reporter | 9.20% | 12.80% | 6.10% | 23925 | 28917 | 17335 |
| snRNA#14 | 62.30% | 63.30% | 63.70% | 574041 | 428688 | 521495 |
| hnRNPA1-snRNA#14 | 66.30% | 71.80% | 66.60% | 783382 | 715282 | 754269 |
| Scramble | 11.00% | 13.30% | 7.70% | 58920 | 75279 | 66826 | screening, PCR and sequencing verification, and the vector was named pUC57-U7-hnRNPA1-snRNA #. The plasmids were purified and stored at −20° C. for later use.

Figure 25:
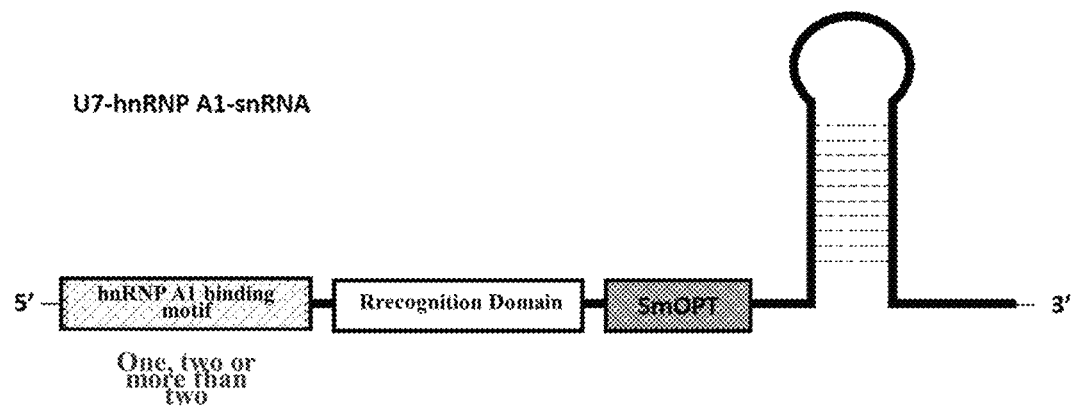
FIG. 25 is a schematic structural diagram of U7-hnRNPA1-snRNA.

U7-hnRNPA1-snRNA could also be chemically synthesized and modified according to the methods described in Example 2 and Example 4. Taking snRNA #14 as an example, the chemically synthesized U7-hnRNPA1-snRNA sequences and modifications were as follows (* represented a phosphorothioate backbone, m represented 2'-methoxyl modification, an underline represented a recognition domain in reversely complementary pairing with the target sequence, an italic represented a smOPT sequence, and a bold indicated hnRNPA1 protein-binding motif):

a schematic structural diagram of 5'-mA*mC*mC*GCAAUAUGAUAGGGACUUAGGGUGACA CUGGCAGGGCUCA CAUCCAAAUUUUUGGA GCAGGUUUUCUGACUUCGGUCGGAAAACC-mC*mC*mU*mU*-3' (SEQ ID NO: 66), U7-hnRNPA1-snRNA was shown in FIG. 25.

Based on the sequence shown in SEQ ID NO: 44, thiophosphorylated backbone modification and methoxyl modification were added to the first three bases at the 5' and 3' ends in the modified sequence.

2. Detection of the efficiency of U7-snRNA linked with a hnRNPA1-binding motif to induce splicing skipping of USH2A Exon 13 in reporter cells.

Detection method: 293 T cells were inoculated into a 24-well plate in a certain amount so that the cell confluence reached about 80% after 24 h. Lipofectamine™ 2000 was used to co-transfect 293 T cells (a vector mass ratio of 100 ng:400 ng) and pCMV-EGFP$_{left}$-Exon13$^{c.2802T>G}$-EGFP$_{right}$ respectively with pUC57-U7-hnRNPA1-snRNA plasmids and pUC57-U7-snRNA plasmids. 293T cells transfected with reporter plasmids alone and 293T cells co-transfected with reporter plasmids and pUC57-U7 Scramble were used as two negative controls. 293T cells without any plasmid transfection were used as a blank control. The transfected cells were continuously cultured for 48-72 h, and trypsinized into single cells, and a flow cytometer was then used to detect the efficiency of splicing skipping induced by different snRNA groups.

In this example, a free tail was introduced at the 5' end of the U7-snRNA. The free tail sequence comprised a binding motif "UAGGGU" of a hnRNPA1 protein. The free tail sequence is preferably "UAUGA UAGGGA CU UAGGGU G" (SEQ ID NO: 45), which could recruit the hnRNPA1 protein, and promote the splicing skipping of USH2A Exon 13, but did not increase double skipping of Exon 12 and Exon 13, affect its targeting specificity, and cause or increase off-target effects.

Example 15

Plasmid vector construction and viral packaging associated with AAV-U7-snRNA that target-induced splicing skipping of Exon 13 in USH2A pre-mRNA.

In this example, the U7-snRNA gene that target-induced splicing skipping of Exon 13 in USH2A pre-mRNA was inserted into and replaced an intermediate gene sequence of two ITR domains in a pAAV-CMV vector, thereby constructing a pAAV-U7-snRNA vector, together with AAV packaging plasmids, i.e., a serotype pRC plasmid (containing a Rep gene of AAV2 and respective Cap genes of each serotype) and a pHelper plasmid (a vector plasmid containing E2A, E4 and VA genes of adenovirus), were co-transfected into a host cell, and packaged to obtain an AAV-U7-snRNA virus that targeted splicing skipping of Exon 13 in USH2A pre-mRNA. The specific operation was as follows:

firstly, a gene sequence, i.e., a U7-snRNA gene expression cassette (without a recognition domain): 5'-mouse U7 promoter-smOPT sequence-U7-snRNA scaffold-snRNA gene-specific 3'box-3' was synthesized by whole gene synthesis. Two Type IIs restriction enzyme recognition sites were added between a U7 promoter and smOPT to facilitate subsequent excision, substitution, and insertion of other recognition domain sequences. A sequence obtained by whole gene synthesis was inserted into and replaced a gene sequence between two AAV2-ITR domains of the pAAV-CMV plasmid, thereby obtaining a pAAV-U7-snRNA backbone vector.

U7-snRNA gene expression cassette (without a recognition domain) (SEQ ID NO:46):

AAGCTTAACAACATAGGAGCTGTGATTGGCTGTTTTCAGCCAATCAGCA

CTGACTCATTTGCATAGCCTTTACAAGCGGTCACAAACTCAAGAAACGA

GCGGTTTTAATAGTCTTTTAGAATATTGTTTATCGAACCGAATAAGGAA

CTGTGCTTTGTGATTCACATATCAGTGGAGGGGTGTGGAAATGGCACCT

TGATCTCACCCTCATCGAAAGTGGAGTTGATGTCCTTCCCTGGCTCGCT

ACAGACGCACTTCCGCAGAGACCAATGTGGGTCTCGAATTTTTGGAGCA

GGTTTTCTGACTTCGGTCGGAAAACCCCTCCCAATTTCACTGGTCTACA

ATGAAAGCAAAACAGTTCTCTTCCCCGCTCCCGGTGTGTGAGAGGGGC

TTTGATCCTTCTCTGGTTTCCTAGGAAACGCGTATGTGCGGCCGC.

According to the methods of Example 1 and Example 6, a corresponding Oligo DNA sense strand and antisense strand were respectively synthesized according to pre-transcriptional DNA sequences corresponding to the snRNA recognition domain sequences in Table 1, and sticky ends similar to those cleaved by Type IIs restriction enzyme recognition sites were added to both ends. A recognition domain double-stranded DNA with sticky ends was formed by annealing. T4 ligase was linked into a linearized pAAV-U7-snRNA backbone plasmid recovered by the corresponding Type type II restriction enzyme digestion to form pAAV-U7-snRNA plasmids that induced splicing skipping by a specific site that targeted Exon 13 in USH2A pre-mRNA. The pAAV-U7-snRNA plasmids were named according to snRNA numbers corresponding to the recognition domain sequences as pAAV-U7-snRNA #3, pAAV-U7-snRNA #14, pAAV-U7-snRNA #16, etc.

A pAAV-U7-snRNA plasmid vector was obtained by inserting a target gene (a U7-snRNA gene expression cassette that target-induced splicing skipping of Exon 13 in USH2A pre-mRNA) into and replaced a gene sequence between AAV2-ITR domains of the PAAV-CMV plasmid. According to the instructions and standard cell operation procedures, the AAV-U7-snRNA virus that target-induced splicing skipping of Exon 13 in USH2A pre-mRNA was obtained.

24 h before transfection, HEK293/293T cells were inoculated into a 100 mm cell culture dish with a medium of 10% FBS DMEM medium and transfected at the confluence of 80%-90%. 3 h before transfection, an old medium was discarded and replaced with a fresh medium. At the time of transfection, a pAAV-U7-snRNA plasmid, a pRC plasmid, a pHelper plasmid, and a PEI (polyethylenimine) transfection reagent was prepared at the same time according to a system in the table below and added dropwise to a culture dish. After the PEI transfection mixture was added, the dish was shaken slightly to evenly distribute the transfection reagent, and the medium was cultured in a 37° C., 5% CO2 incubator.

TABLE 13

| PEI transfection system | |
|---|---|
| Reagent | Dosing volume |
| pAAV plasmid (1 µg/µl) | 6 µL |
| pRC1/2/5/6 plasmid (1 µg/µl) (pRC plasmid capsid gene determined serotype) | 6 µL |
| pHelper plasmid (1 µg/µl) | 6 µL |
| Serum-free DMEM medium | 500 µL |
| PEI (1 mg/mL) | 110 µL |

The culture was vortexed several times and incubated at room temperature for 5 min.

24 h after transfection, a DMEM medium with fresh 2% FBS was replaced. 48-72 h after transfection, AAV virus-containing cells were collected, washed, and centrifuged, and a cell pellet was collected, and vortexed and oscillated to break. Subsequently, 0.5 mL of AAV Extraction Solution A was added to the cell pellet according to the kit instructions, and the cell pellet was fully suspended by vortexing for 15 seconds, stewed at room temperature for 5 min, and then vortexed and oscillated for 15 seconds, centrifuged under 2,000-14,000 g for 10 min at 4° C. to remove cell debris. A supernatant was collected into a new sterile centrifuge tube, added with 50 µL of AAV Extraction Solution B, and aspirated and mixed well by using a pipette to obtain AAV-U7-snRNA virus solutions with different recognition domains. A part of the solutions was taken and detected for viral titer by qPCR, and stored at 80° C. for later use.

Since an AAV2-ITR domain of the inserted AAV-U7-snRNA plasmid and its inserted target gene fragment should be less than 4.7 kb, by inserting a plurality of U7-snRNA gene expression cassettes (5'-mouse U7 promoter-recognition domain-smOPT sequence, snRNA gene-specific 3'box-3'), the expression of U7-snRNA could be increased with the same number of AAV virus particles. The gene sequence had a length of about 450 bp, and the pAAV-U7-snRNA plasmid preferably carried 1-10 U7-snRNA gene expression cassettes, and the plurality of U7-snRNA gene expression cassettes in the pAAV-U7-snRNA plasmid could have the same recognition domain.

Various technical features of the foregoing examples may be randomly combined. To make the description concise, not all possible combinations of the technical features in the foregoing examples are described. However, the combinations of these technical features shall be considered as falling within the scope recorded by this description provided that no conflict exists.

The above-mentioned embodiments only express several embodiments of the present invention, and the description is relatively specific and detailed, but it should not be understood as a limitation to the patent scope of the present invention. It should be pointed out that for those of ordinary skill in the art, without departing from the concept of the present invention, several modifications and improvements can be made, and these all fall within the protection scope of the present invention. Therefore, the protection scope of the patent of the present invention should be subject to the appended claims.

What is claimed is:

1. An snRNA that targets an USH2A pre-mRNA to induce splicing skipping of Exon 13, wherein the snRNA comprises a recognition domain that is reversely complementary to the USH2A pre-mRNA sequence, a smOPT sequence shown in SEQ ID NO: 31, and a U7-snRNA scaffold sequence, wherein the recognition domain of the snRNA is selected from the following sequences: SEQ ID NOs: 11, 15, and 17.

2. The snRNA of claim 1, wherein the U7-snRNA scaffold sequence is shown in SEQ ID NO: 68.

3. The snRNA of claim 2, wherein the snRNA further comprises a motif that recruits a splicing regulatory protein comprising at least one of hnRNPA1, SRSF1, RBM4, DAZAP1, and SR.

4. The snRNA of claim 1, wherein the snRNA comprises from 5' to 3' the recognition domain that is reversely complementary to the USH2A pre-mRNA sequence, the smOPT sequence shown in SEQ ID NO: 31, and a U7-snRNA scaffold sequence shown in SEQ ID NO: 68.

5. The snRNA of claim 1, wherein the recognition domain of the snRNA is SEQ ID NO: 11.

6. The snRNA of claim 1, wherein the recognition domain of the snRNA is SEQ ID NO: 15.

7. The snRNA of claim 1, wherein the recognition domain of the snRNA is SEQ ID NO: 17.

8. A nucleic acid, wherein the nucleic acid comprises a nucleotide sequence encoding an snRNA; wherein the snRNA comprises a recognition domain that is reversely complementary to an USH2A pre-mRNA sequence, a smOPT sequence shown in SEQ ID NO: 31, and a U7-snRNA scaffold sequence, wherein the recognition domain of the snRNA is selected from the following sequences: SEQ ID NOs: 11, 15 and 17, and wherein the snRNA binds to the USH2A pre-mRNA to induce splicing skipping of Exon 13.

9. A pharmaceutical composition comprising the snRNA of claim 1, or a vector comprising the nucleic acid of claim 8; optionally wherein the snRNA or the vector is in a virus particle or a cell.

10. A method for obtaining a Usherin protein with a deletion of Exon 13, wherein the method comprises contacting an USH2A pre-mRNA with the snRNA of claim 1, or a vector comprising the nucleic acid of claim 8, optionally wherein the snRNA or the vector is in a viral particle, a cell, or a pharmaceutical composition.

11. A method for preventing or treating retinitis Pigmentosa associated with Usher syndrome type 2 in a subject in need thereof, wherein the method comprises administering an effective amount of one or more selected from an snRNA, or a vector encoding the snRNA to the subject; optionally wherein the snRNA or the vector encoding the snRNA is in a viral particle, a cell, or a pharmaceutical composition; wherein the snRNA comprises a recognition domain that is reversely complementary to an USH2A pre-mRNA sequence, a smOPT sequence shown in SEQ ID NO: 31, and a U7-snRNA scaffold sequence, wherein the recognition domain of the snRNA is selected from the following sequences: SEQ ID NOs: 11, 15 and 17, and wherein the snRNA binds to the USH2A pre-mRNA to induce splicing skipping of Exon 13.

* * * * *

SEQUENCE LISTING

```
Sequence total quantity: 68
SEQ ID NO: 1         moltype = DNA  length = 44
FEATURE              Location/Qualifiers
source               1..44
```

```
                        mol_type = other DNA
                        organism = synthetic construct
SEQUENCE: 1
cgaagcttta atgatgttgg atgtgagccc tgccagtgta acct                  44

SEQ ID NO: 2            moltype = DNA  length = 32
FEATURE                 Location/Qualifiers
source                  1..32
                        mol_type = other DNA
                        organism = synthetic construct
SEQUENCE: 2
gagccctgcc agtgtaacct ccatggctca gt                               32

SEQ ID NO: 3            moltype = DNA  length = 34
FEATURE                 Location/Qualifiers
source                  1..34
                        mol_type = other DNA
                        organism = synthetic construct
SEQUENCE: 3
aatcagtggc cagtgcctgt gtgtgcctaa tcgt                             34

SEQ ID NO: 4            moltype = DNA  length = 34
FEATURE                 Location/Qualifiers
source                  1..34
                        mol_type = other DNA
                        organism = synthetic construct
SEQUENCE: 4
taaatatatt ttatctttag ggcttaggtg tgat                             34

SEQ ID NO: 5            moltype = DNA  length = 29
FEATURE                 Location/Qualifiers
source                  1..29
                        mol_type = other DNA
                        organism = synthetic construct
SEQUENCE: 5
ctttagggct taggtgtgat cattgcaat                                   29

SEQ ID NO: 6            moltype = DNA  length = 34
FEATURE                 Location/Qualifiers
source                  1..34
                        mol_type = other DNA
                        organism = synthetic construct
SEQUENCE: 6
ggtgtgatca ttgcaatttt ggatttaaat ttct                             34

SEQ ID NO: 7            moltype = DNA  length = 34
FEATURE                 Location/Qualifiers
source                  1..34
                        mol_type = other DNA
                        organism = synthetic construct
SEQUENCE: 7
ttggatttaa atttctccga agctttaatg atgt                             34

SEQ ID NO: 8            moltype = DNA  length = 24
FEATURE                 Location/Qualifiers
source                  1..24
                        mol_type = other DNA
                        organism = synthetic construct
SEQUENCE: 8
agccctaaag ataaaatata ttta                                        24

SEQ ID NO: 9            moltype = DNA  length = 24
FEATURE                 Location/Qualifiers
source                  1..24
                        mol_type = other DNA
                        organism = synthetic construct
SEQUENCE: 9
acctaagccc taaagataaa atat                                        24

SEQ ID NO: 10           moltype = DNA  length = 24
FEATURE                 Location/Qualifiers
source                  1..24
                        mol_type = other DNA
                        organism = synthetic construct
SEQUENCE: 10
atcacaccta agccctaaag ataa                                        24

SEQ ID NO: 11           moltype = DNA  length = 24
FEATURE                 Location/Qualifiers
```

```
source                  1..24
                        mol_type = other DNA
                        organism = synthetic construct
SEQUENCE: 11
aatgatcaca cctaagccct aaag                                              24

SEQ ID NO: 12           moltype = DNA   length = 24
FEATURE                 Location/Qualifiers
source                  1..24
                        mol_type = other DNA
                        organism = synthetic construct
SEQUENCE: 12
attgcaatga tcacacctaa gccc                                              24

SEQ ID NO: 13           moltype = DNA   length = 24
FEATURE                 Location/Qualifiers
source                  1..24
                        mol_type = other DNA
                        organism = synthetic construct
SEQUENCE: 13
atccaaaatt gcaatgatca cacc                                              24

SEQ ID NO: 14           moltype = DNA   length = 24
FEATURE                 Location/Qualifiers
source                  1..24
                        mol_type = other DNA
                        organism = synthetic construct
SEQUENCE: 14
atttaaatcc aaaattgcaa tgat                                              24

SEQ ID NO: 15           moltype = DNA   length = 24
FEATURE                 Location/Qualifiers
source                  1..24
                        mol_type = other DNA
                        organism = synthetic construct
SEQUENCE: 15
agaaatttaa atccaaaatt gcaa                                              24

SEQ ID NO: 16           moltype = DNA   length = 24
FEATURE                 Location/Qualifiers
source                  1..24
                        mol_type = other DNA
                        organism = synthetic construct
SEQUENCE: 16
agcttcggag aaatttaaat ccaa                                              24

SEQ ID NO: 17           moltype = DNA   length = 24
FEATURE                 Location/Qualifiers
source                  1..24
                        mol_type = other DNA
                        organism = synthetic construct
SEQUENCE: 17
attaaagctt cggagaaatt taaa                                              24

SEQ ID NO: 18           moltype = DNA   length = 24
FEATURE                 Location/Qualifiers
source                  1..24
                        mol_type = other DNA
                        organism = synthetic construct
SEQUENCE: 18
acatcattaa agcttcggag aaat                                              24

SEQ ID NO: 19           moltype = DNA   length = 24
FEATURE                 Location/Qualifiers
source                  1..24
                        mol_type = other DNA
                        organism = synthetic construct
SEQUENCE: 19
acatccaaca tcattaaagc ttcg                                              24

SEQ ID NO: 20           moltype = DNA   length = 24
FEATURE                 Location/Qualifiers
source                  1..24
                        mol_type = other DNA
                        organism = synthetic construct
SEQUENCE: 20
agggctcaca tccaacatca ttaa                                              24

SEQ ID NO: 21           moltype = DNA   length = 22
```

```
FEATURE              Location/Qualifiers
source               1..22
                     mol_type = other DNA
                     organism = synthetic construct
SEQUENCE: 21
acactggcag ggctcacatc ca                                      22

SEQ ID NO: 22        moltype = DNA   length = 27
FEATURE              Location/Qualifiers
source               1..27
                     mol_type = other DNA
                     organism = synthetic construct
SEQUENCE: 22
acactggcag ggctcacatc caacatc                                 27

SEQ ID NO: 23        moltype = DNA   length = 24
FEATURE              Location/Qualifiers
source               1..24
                     mol_type = other DNA
                     organism = synthetic construct
SEQUENCE: 23
aggttacact ggcagggctc acat                                    24

SEQ ID NO: 24        moltype = DNA   length = 24
FEATURE              Location/Qualifiers
source               1..24
                     mol_type = other DNA
                     organism = synthetic construct
SEQUENCE: 24
atggaggtta cactggcagg gctc                                    24

SEQ ID NO: 25        moltype = DNA   length = 24
FEATURE              Location/Qualifiers
source               1..24
                     mol_type = other DNA
                     organism = synthetic construct
SEQUENCE: 25
actgagccat ggaggttaca ctgg                                    24

SEQ ID NO: 26        moltype = DNA   length = 24
FEATURE              Location/Qualifiers
source               1..24
                     mol_type = other DNA
                     organism = synthetic construct
SEQUENCE: 26
acacacaggc actggccact gatt                                    24

SEQ ID NO: 27        moltype = DNA   length = 24
FEATURE              Location/Qualifiers
source               1..24
                     mol_type = other DNA
                     organism = synthetic construct
SEQUENCE: 27
aggcacacac aggcactggc cact                                    24

SEQ ID NO: 28        moltype = DNA   length = 24
FEATURE              Location/Qualifiers
source               1..24
                     mol_type = other DNA
                     organism = synthetic construct
SEQUENCE: 28
acgattaggc acacacaggc actg                                    24

SEQ ID NO: 29        moltype = DNA   length = 20
FEATURE              Location/Qualifiers
source               1..20
                     mol_type = other DNA
                     organism = synthetic construct
SEQUENCE: 29
aggtgtagtc gaccatcgtg                                         20

SEQ ID NO: 30        moltype = DNA   length = 11
FEATURE              Location/Qualifiers
source               1..11
                     mol_type = other DNA
                     organism = synthetic construct
SEQUENCE: 30
aatttgtcta g                                                  11
```

```
SEQ ID NO: 31           moltype = DNA  length = 11
FEATURE                 Location/Qualifiers
source                  1..11
                        mol_type = other DNA
                        organism = synthetic construct
SEQUENCE: 31
aatttttgga g                                                              11

SEQ ID NO: 32           moltype = DNA  length = 13
FEATURE                 Location/Qualifiers
source                  1..13
                        mol_type = other DNA
                        organism = synthetic construct
SEQUENCE: 32
gtctacaatg aaa                                                            13

SEQ ID NO: 33           moltype = DNA  length = 66
FEATURE                 Location/Qualifiers
source                  1..66
                        mol_type = other DNA
                        organism = synthetic construct
SEQUENCE: 33
aggttacact ggcagggctc acataatttt tggagcaggt tttctgactt cggtcggaaa         60
acccct                                                                    66

SEQ ID NO: 34           moltype = DNA  length = 69
FEATURE                 Location/Qualifiers
source                  1..69
                        mol_type = other DNA
                        organism = synthetic construct
SEQUENCE: 34
acactggcag ggctcacatc caacatcaat ttttggagca ggttttctga cttcggtcgg         60
aaaacccct                                                                 69

SEQ ID NO: 35           moltype = DNA  length = 336
FEATURE                 Location/Qualifiers
source                  1..336
                        mol_type = other DNA
                        organism = synthetic construct
SEQUENCE: 35
atggtgagca agggcgagga gctgttcacc ggggtggtgc ccatcctggt cgagctggac         60
ggcgacgtaa acgccacaa gttcagcgtg tccggcgagg gcgagggcga tgccacctac         120
ggcaagctga cccctgaagtt catctgcacc accggcaagc tgcccgtgcc ctggcccacc       180
ctcgtgacca ccctgaccta cggcgtgcag tgcttcagcc gctaccccga ccacatgaag        240
cagcacgact tcttcaagtc cgccatgccc gaaggctacg tccaggagcg caccatcttc        300
ttcaaggacg acggcaacta caagacccgc gccgag                                   336

SEQ ID NO: 36           moltype = DNA  length = 384
FEATURE                 Location/Qualifiers
source                  1..384
                        mol_type = other DNA
                        organism = synthetic construct
SEQUENCE: 36
gtgaagttcg agggcgacac cctggtgaac cgcatcgagc tgaagggcat cgacttcaag         60
gaggacggca acatcctggg gcacaagctg gagtacaact acaacagcca caacgtctat        120
atcatggccg acaagcagaa gaacggcatc aaggtgaact tcaagatccg ccacaacatc        180
gaggacggca gcgtgcagct cgccgaccac taccagcaga acacccccat cggcgacggc        240
cccgtgctgc tgcccgacaa ccactacctg agcacccagt ccgccctgag caaagacccc       300
aacgagaagc gcgatcacat ggtcctgctg gagttcgtga ccgccgccgg gatcactctc        360
ggcatggacg agctgtacaa gtaa                                                384

SEQ ID NO: 37           moltype = DNA  length = 21
FEATURE                 Location/Qualifiers
source                  1..21
                        mol_type = other DNA
                        organism = synthetic construct
SEQUENCE: 37
agcctttccg ccaaggtgat c                                                   21

SEQ ID NO: 38           moltype = DNA  length = 21
FEATURE                 Location/Qualifiers
source                  1..21
                        mol_type = other DNA
                        organism = synthetic construct
SEQUENCE: 38
cacaacgttg cccagcaatg g                                                   21

SEQ ID NO: 39           moltype = DNA  length = 26
FEATURE                 Location/Qualifiers
```

```
source                   1..26
                         mol_type = other DNA
                         organism = synthetic construct
SEQUENCE: 39
ccgcaatatg atagggactt agggtg                                              26

SEQ ID NO: 40            moltype = DNA   length = 22
FEATURE                  Location/Qualifiers
source                   1..22
                         mol_type = other DNA
                         organism = synthetic construct
SEQUENCE: 40
caccctaagt ccctatcata tt                                                  22

SEQ ID NO: 41            moltype = DNA   length = 22
FEATURE                  Location/Qualifiers
source                   1..22
                         mol_type = other DNA
                         organism = synthetic construct
SEQUENCE: 41
acactggcag ggctcacatc ca                                                  22

SEQ ID NO: 42            moltype = DNA   length = 48
FEATURE                  Location/Qualifiers
source                   1..48
                         mol_type = other DNA
                         organism = synthetic construct
SEQUENCE: 42
ccgcaatatg atagggactt agggtgacac tggcagggct cacatcca                      48

SEQ ID NO: 43            moltype = DNA   length = 48
FEATURE                  Location/Qualifiers
source                   1..48
                         mol_type = other DNA
                         organism = synthetic construct
SEQUENCE: 43
aatttggatg tgagccctgc cagtgtcacc ctaagtccct atcatatt                      48

SEQ ID NO: 44            moltype = DNA   length = 91
FEATURE                  Location/Qualifiers
source                   1..91
                         mol_type = other DNA
                         organism = synthetic construct
SEQUENCE: 44
accgcaatat gatagggact tagggtgaca ctggcagggc tcacatccaa attttggag          60
caggttttct gacttcggtc ggaaaacccc t                                        91

SEQ ID NO: 45            moltype = DNA   length = 20
FEATURE                  Location/Qualifiers
source                   1..20
                         mol_type = other DNA
                         organism = synthetic construct
SEQUENCE: 45
tatgataggg acttagggtg                                                     20

SEQ ID NO: 46            moltype = DNA   length = 437
FEATURE                  Location/Qualifiers
source                   1..437
                         mol_type = other DNA
                         organism = synthetic construct
SEQUENCE: 46
aagcttaaca acataggagc tgtgattggc tgttttcagc caatcagcac tgactcattt         60
gcatagcctt tacaagcggt cacaaactca agaaacgagc ggttttaata gtctttttaga       120
atattgttta tcgaaccgaa taaggaactg tgctttgtga ttcacatatc agtggagggg       180
tgtggaaatg gcaccttgat ctcaccctca tcgaaagtgg agttgatgtc cttccctggc       240
tcgctacaga cgcacttccg cagagaccaa tgtgggtctc gaattttggg agcaggtttt       300
ctgacttcgt cgaaaacc cctcccaatt tcactggtct acaatgaaag caaaacagtt         360
ctcttccccg ctccccggtg tgtgagaggg gctttgatcc ttctctggtt tcctaggaaa       420
cgcgtatgtg cggccgc                                                      437

SEQ ID NO: 47            moltype = DNA   length = 84
FEATURE                  Location/Qualifiers
source                   1..84
                         mol_type = other DNA
                         organism = synthetic construct
SEQUENCE: 47
attttggatt taaatttctc cgaagcttta atgatgttgg atgtgagccc tgccagtgta         60
acctccatgg ctcagtgaac aaat                                                84
```

```
SEQ ID NO: 48              moltype = DNA   length = 84
FEATURE                    Location/Qualifiers
source                     1..84
                           mol_type = other DNA
                           organism = synthetic construct
SEQUENCE: 48
atttgttcac tgagccatgg aggttacact ggcagggctc acatccaaca tcattaaagc    60
ttcggagaaa tttaaatcca aaat                                           84

SEQ ID NO: 49              moltype = DNA   length = 73
FEATURE                    Location/Qualifiers
source                     1..73
                           mol_type = other DNA
                           organism = synthetic construct
SEQUENCE: 49
tttaatgatg ttggatgtga gccctgccag tgtaacctcc atggctcagt gaacaaattc    60
tgcaatcctc act                                                       73

SEQ ID NO: 50              moltype = DNA   length = 73
FEATURE                    Location/Qualifiers
source                     1..73
                           mol_type = other DNA
                           organism = synthetic construct
SEQUENCE: 50
agtgaggatt gcagaatttg ttcactgagc catggaggtt acactggcag gctcacatc     60
caacatcatt aaa                                                       73

SEQ ID NO: 51              moltype = DNA   length = 61
FEATURE                    Location/Qualifiers
source                     1..61
                           mol_type = other DNA
                           organism = synthetic construct
SEQUENCE: 51
ccatttgtga cccaatcagt ggccagtgcc tgtgtgtgcc taatcgtcaa ggaagaaggt    60
g                                                                    61

SEQ ID NO: 52              moltype = DNA   length = 61
FEATURE                    Location/Qualifiers
source                     1..61
                           mol_type = other DNA
                           organism = synthetic construct
SEQUENCE: 52
caccttcttc cttgacgatt aggcacacac aggcactggc cactgattgg gtcacaaatg    60
g                                                                    61

SEQ ID NO: 53              moltype = DNA   length = 58
FEATURE                    Location/Qualifiers
source                     1..58
                           mol_type = other DNA
                           organism = synthetic construct
SEQUENCE: 53
atcctcacct tttaaatata ttttatcttt agggcttagg tgtgatcatt gcaatttt      58

SEQ ID NO: 54              moltype = DNA   length = 58
FEATURE                    Location/Qualifiers
source                     1..58
                           mol_type = other DNA
                           organism = synthetic construct
SEQUENCE: 54
aaaattgcaa tgatcacacc taagccctaa agataaaata tatttaaaag gtgaggat      58

SEQ ID NO: 55              moltype = DNA   length = 73
FEATURE                    Location/Qualifiers
source                     1..73
                           mol_type = other DNA
                           organism = synthetic construct
SEQUENCE: 55
acctttaaa tatattttat ctttagggct taggtgtgat cattgcaatt ttggatttaa     60
atttctccga agc                                                       73

SEQ ID NO: 56              moltype = DNA   length = 73
FEATURE                    Location/Qualifiers
source                     1..73
                           mol_type = other DNA
                           organism = synthetic construct
SEQUENCE: 56
gcttcggaga aatttaaatc caaaattgca atgatcacac ctaagcccta agataaaat     60
atatttaaaa ggt                                                       73
```

```
SEQ ID NO: 57           moltype = DNA  length = 76
FEATURE                 Location/Qualifiers
source                  1..76
                        mol_type = other DNA
                        organism = synthetic construct
SEQUENCE: 57
tattttatct ttagggctta ggtgtgatca ttgcaattt ggatttaaat ttctccgaag     60
ctttaatgat gttgga                                                   76

SEQ ID NO: 58           moltype = DNA  length = 76
FEATURE                 Location/Qualifiers
source                  1..76
                        mol_type = other DNA
                        organism = synthetic construct
SEQUENCE: 58
tccaacatca ttaaagcttc ggagaaattt aaatccaaaa ttgcaatgat cacacctaag    60
ccctaaagat aaaata                                                   76

SEQ ID NO: 59           moltype = DNA  length = 80
FEATURE                 Location/Qualifiers
source                  1..80
                        mol_type = other DNA
                        organism = synthetic construct
SEQUENCE: 59
ggcttaggtg tgatcattgc aattttggat ttaaatttct ccgaagcttt aatgatgttg    60
gatgtgagcc ctgccagtgt                                               80

SEQ ID NO: 60           moltype = DNA  length = 80
FEATURE                 Location/Qualifiers
source                  1..80
                        mol_type = other DNA
                        organism = synthetic construct
SEQUENCE: 60
acactggcag ggctcacatc caacatcatt aaagcttcgg agaaatttaa atccaaaatt    60
gcaatgatca cacctaagcc                                               80

SEQ ID NO: 61           moltype = RNA  length = 11
FEATURE                 Location/Qualifiers
source                  1..11
                        mol_type = other RNA
                        organism = synthetic construct
SEQUENCE: 61
aatttgtcta g                                                        11

SEQ ID NO: 62           moltype = RNA  length = 12
FEATURE                 Location/Qualifiers
source                  1..12
                        mol_type = other RNA
                        organism = synthetic construct
modified_base           1..12
                        mod_base = OTHER
                        note = 2-O-methoxyl modification and thiophosphorylation
SEQUENCE: 62
agctggaatt at                                                       12

SEQ ID NO: 63           moltype = RNA  length = 18
FEATURE                 Location/Qualifiers
source                  1..18
                        mol_type = other RNA
                        organism = synthetic construct
modified_base           1..18
                        mod_base = OTHER
                        note = 2-O-methoxyl modification and thiophosphorylation
SEQUENCE: 63
tgatcactaa gcctaaaa                                                 18

SEQ ID NO: 64           moltype = RNA  length = 66
FEATURE                 Location/Qualifiers
source                  1..66
                        mol_type = other RNA
                        organism = synthetic construct
modified_base           join(1..3,64..66)
                        mod_base = OTHER
                        note = thiophosphorylated backbone modification and
                         methoxyl modification
SEQUENCE: 64
aggttacact ggcagggctc acataatttt tggagcaggt tttctgactt cggtcggaaa    60
acccct                                                              66
```

```
SEQ ID NO: 65            moltype = RNA   length = 69
FEATURE                  Location/Qualifiers
source                   1..69
                         mol_type = other RNA
                         organism = synthetic construct
modified_base            join(1..3,67..69)
                         mod_base = OTHER
                         note = thiophosphorylated backbone modification and
                           methoxyl modification
SEQUENCE: 65
acactggcag ggctcacatc caacatcaat ttttggagca ggttttctga cttcggtcgg    60
aaaacccct                                                            69

SEQ ID NO: 66            moltype = RNA   length = 92
FEATURE                  Location/Qualifiers
source                   1..92
                         mol_type = other RNA
                         organism = synthetic construct
modified_base            join(1..3,89..92)
                         mod_base = OTHER
                         note = thiophosphorylated backbone modification and
                           methoxyl modification
SEQUENCE: 66
accgcaatat gatagggact tagggtgaca ctggcagggc tcacatccaa attttggag    60
caggttttct gacttcggtc ggaaaacccc tt                                  92

SEQ ID NO: 67            moltype = RNA   length = 24
FEATURE                  Location/Qualifiers
source                   1..24
                         mol_type = other RNA
                         organism = synthetic construct
SEQUENCE: 67
accttcttcc ttgacgatta ggca                                           24

SEQ ID NO: 68            moltype = RNA   length = 31
FEATURE                  Location/Qualifiers
source                   1..31
                         mol_type = other RNA
                         organism = synthetic construct
SEQUENCE: 68
caggttttct gacttcggtc ggaaaacccc t                                   31
```